United States Patent
Grimm et al.

(10) Patent No.: US 7,058,189 B1
(45) Date of Patent: Jun. 6, 2006

(54) AUDIO MONITORING AND CONVERSION APPARATUS AND METHOD

(75) Inventors: Maynard Grimm, Fremont, CA (US); Joe Wellman, Salisbury, MD (US)

(73) Assignee: Pixel Instruments Corp., Los Gatos, CA (US)

( * ) Notice: Subject to any disclaimer, the term of this patent is extended or adjusted under 35 U.S.C. 154(b) by 564 days.

(21) Appl. No.: 10/017,513

(22) Filed: Dec. 14, 2001

(51) Int. Cl.
- H04B 1/00 (2006.01)
- H04R 29/00 (2006.01)
- H03G 3/00 (2006.01)
- G10L 11/04 (2006.01)
- G06F 17/00 (2006.01)

(52) U.S. Cl. .......... 381/119; 381/56; 381/61; 704/206; 700/94

(58) Field of Classification Search .......... 381/56, 381/73.1, 119, 61, 107, 97–98, 77, 100–104, 381/307, 123; 700/94; 348/738
See application file for complete search history.

(56) References Cited

U.S. PATENT DOCUMENTS

| | | | | |
|---|---|---|---|---|
| 4,275,268 A | * | 6/1981 | Takahashi et al. | 381/119 |
| 5,014,341 A | * | 5/1991 | Bittel | 455/3.06 |
| 5,910,996 A | * | 6/1999 | Eggers et al. | 381/107 |
| 6,041,295 A | * | 3/2000 | Hinderks | 704/206 |
| 6,681,018 B1 | * | 1/2004 | Asakura et al. | 381/119 |
| 6,718,217 B1 | * | 4/2004 | Shinohara et al. | 700/94 |
| 6,795,560 B1 | * | 9/2004 | Hamamatsu | 381/119 |

* cited by examiner

Primary Examiner—Laura A. Grier
(74) Attorney, Agent, or Firm—J. Carl Cooper

(57) ABSTRACT

A method and apparatus is described for electronic signal monitoring and conversion to differing form. The preferred embodiment includes automatic selection of an audio signal from a plurality of input signals which may be in differing form, and conversion and processing of the selected signal to place it into one or more desired form to be output for further use. Further operations include delaying and mixing a plurality of signals may take place automatically or under operator control. Visual and/or audible monitoring of the signal(s) is also shown.

15 Claims, 22 Drawing Sheets

Stock:
Audio Monitor, Bar Graph

Options:
1. Audio Out
2. Audio In, Sample Rate converter & Mixer
3. Tone Generator Audio Display Voice Over & Tone
Overall Block Diagram

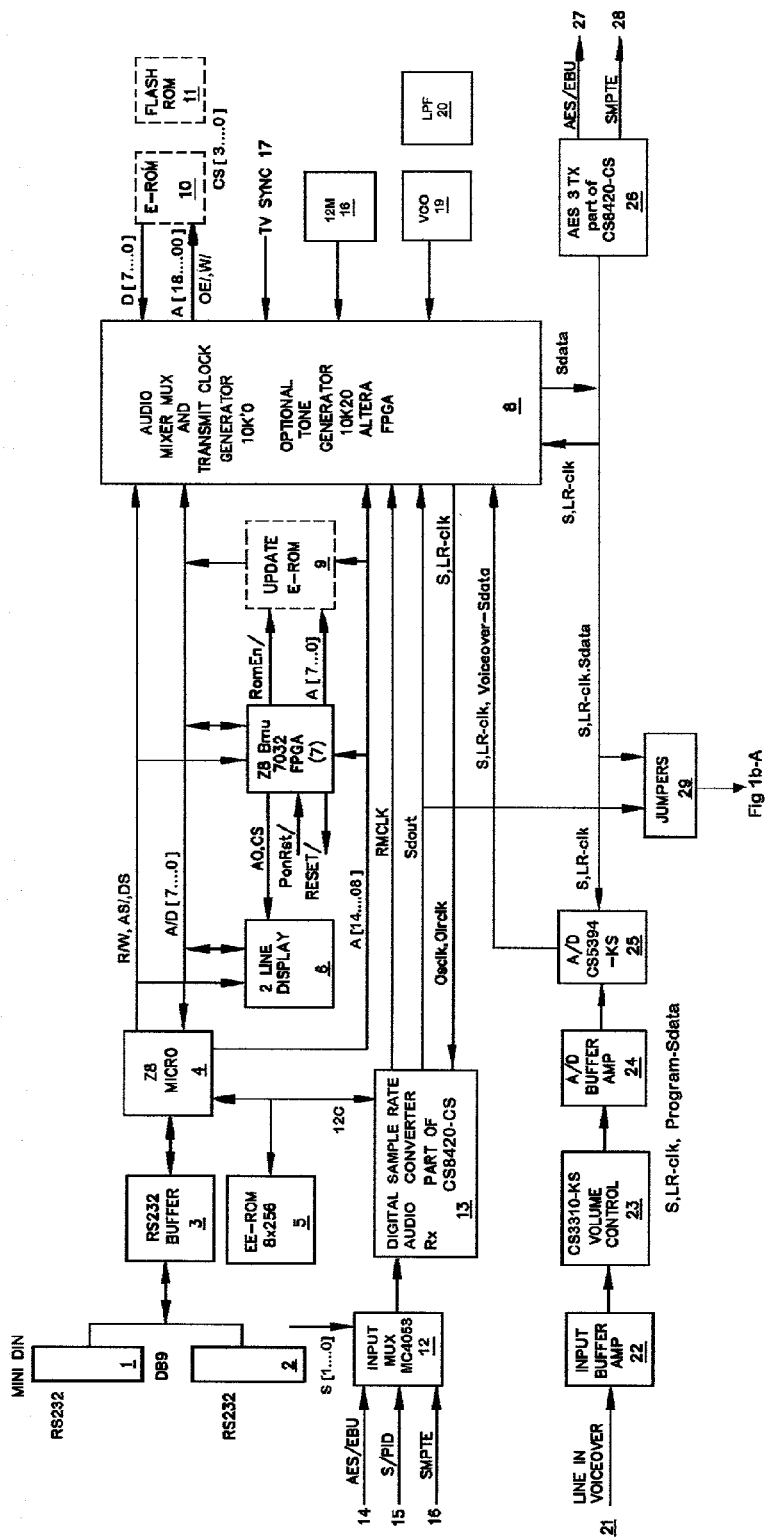

Audio Display Voice Over & Tone
Overall Block Diagram

Audio Display Voice Over & Tone
Inside the Gene FPGA

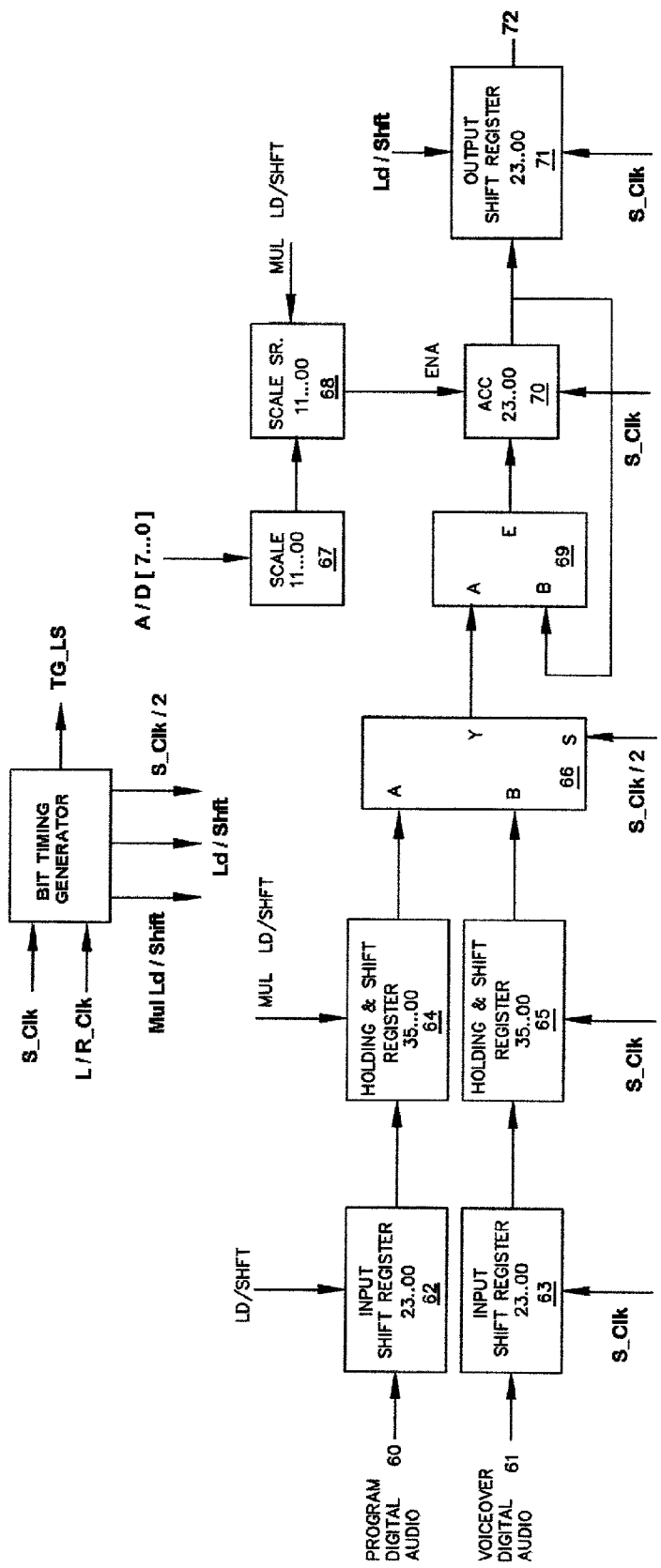

Audio Display Voice Over & Tone Computer Interface

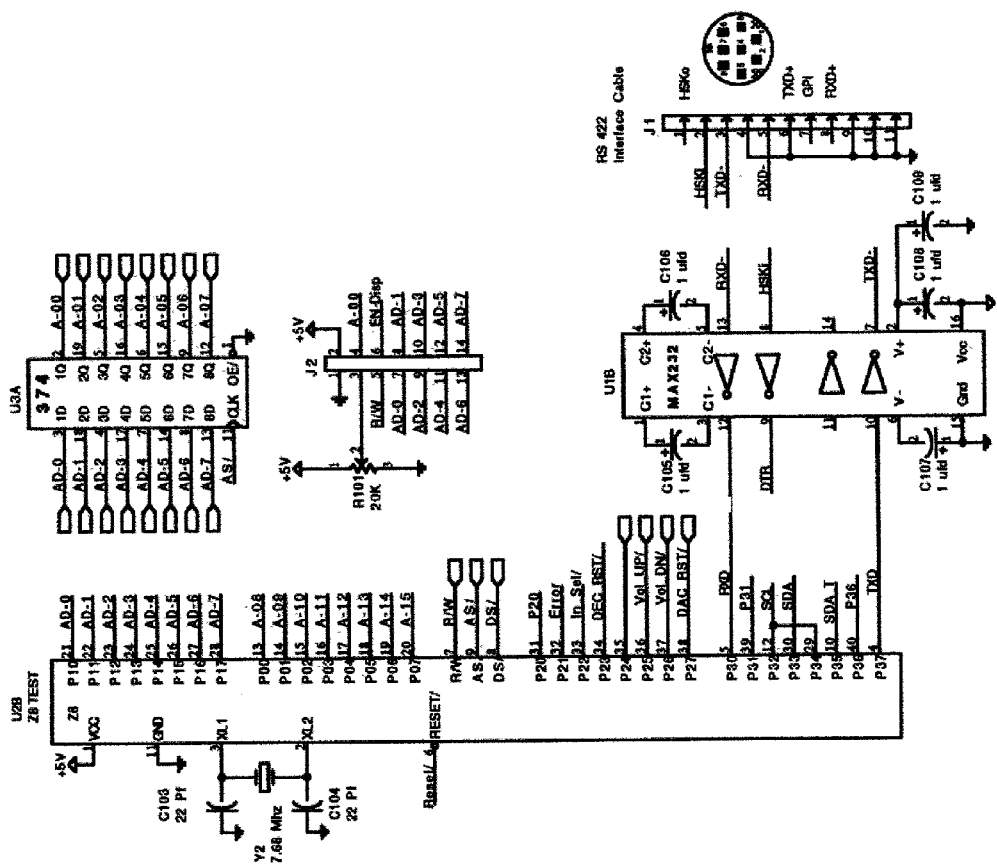

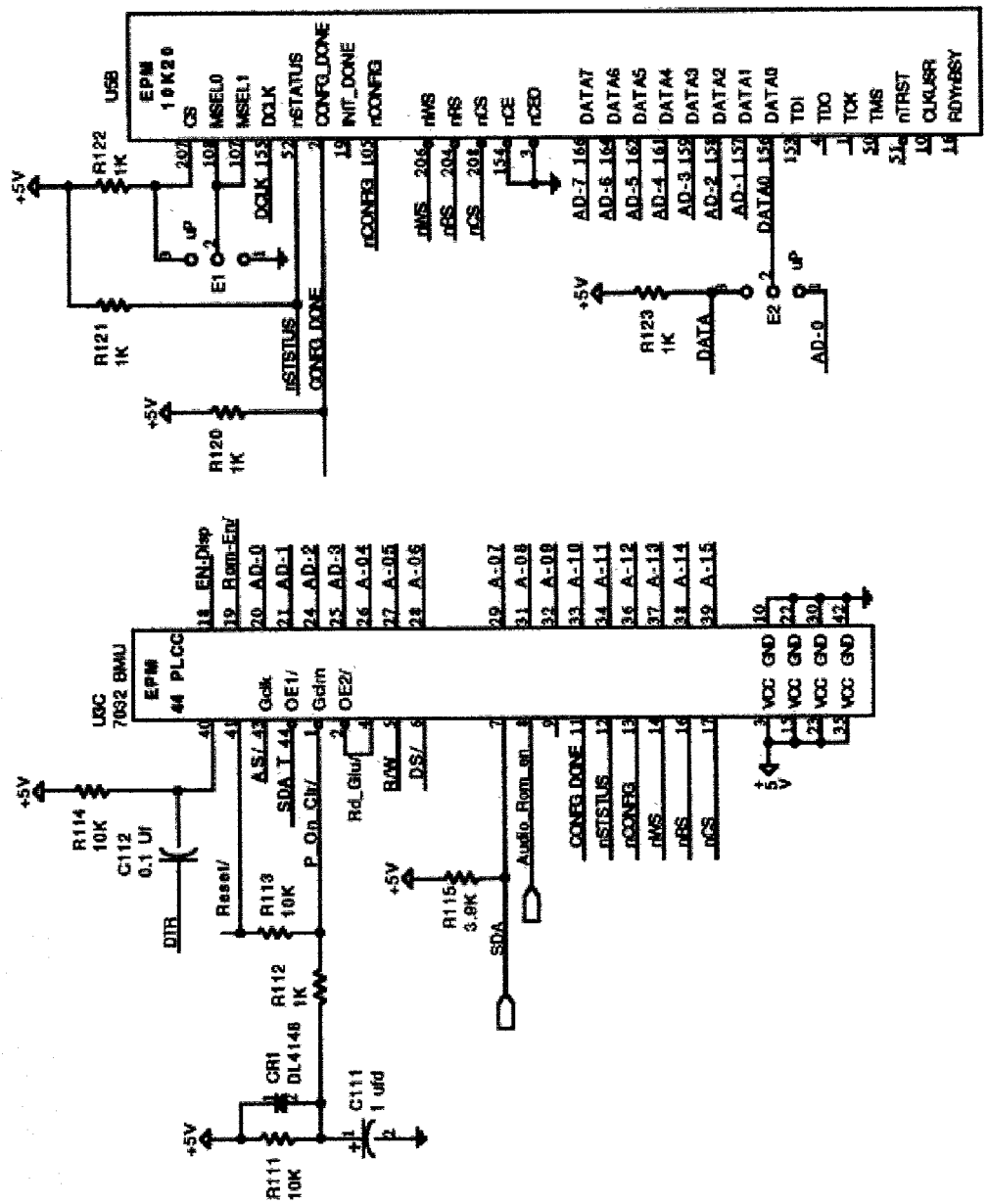

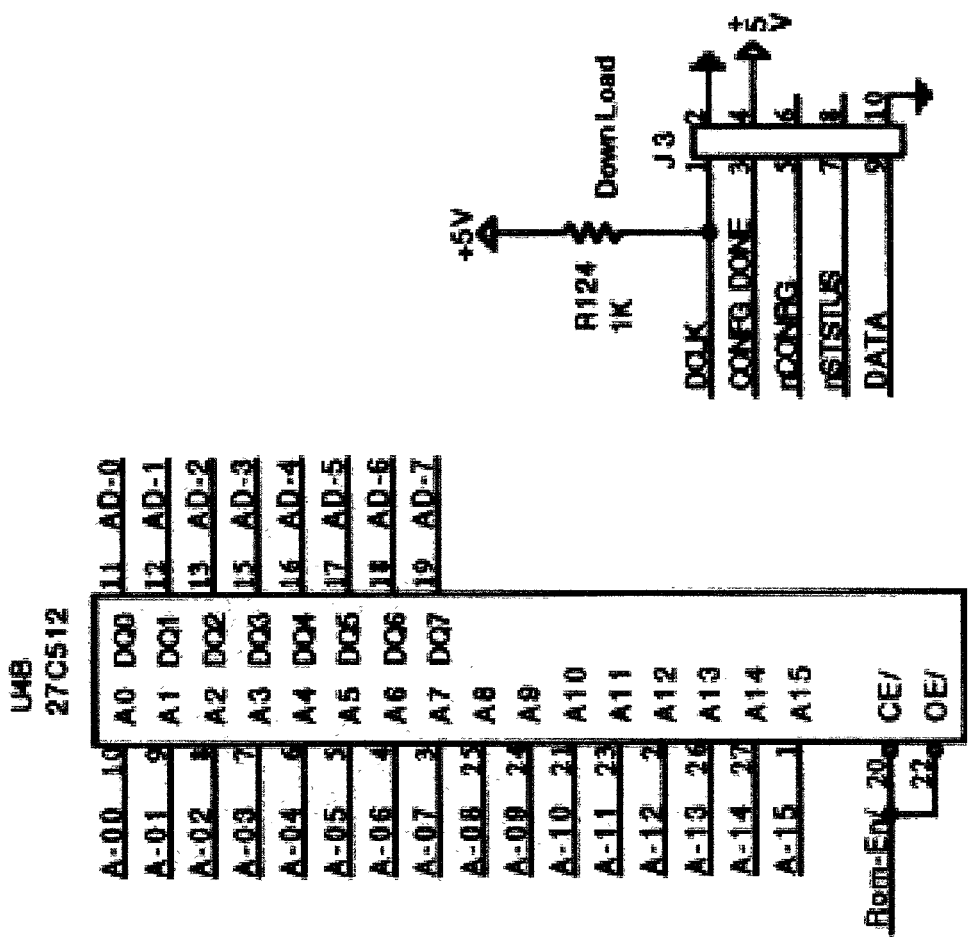

Audio Display Voice Over & Tone
Computer Interface

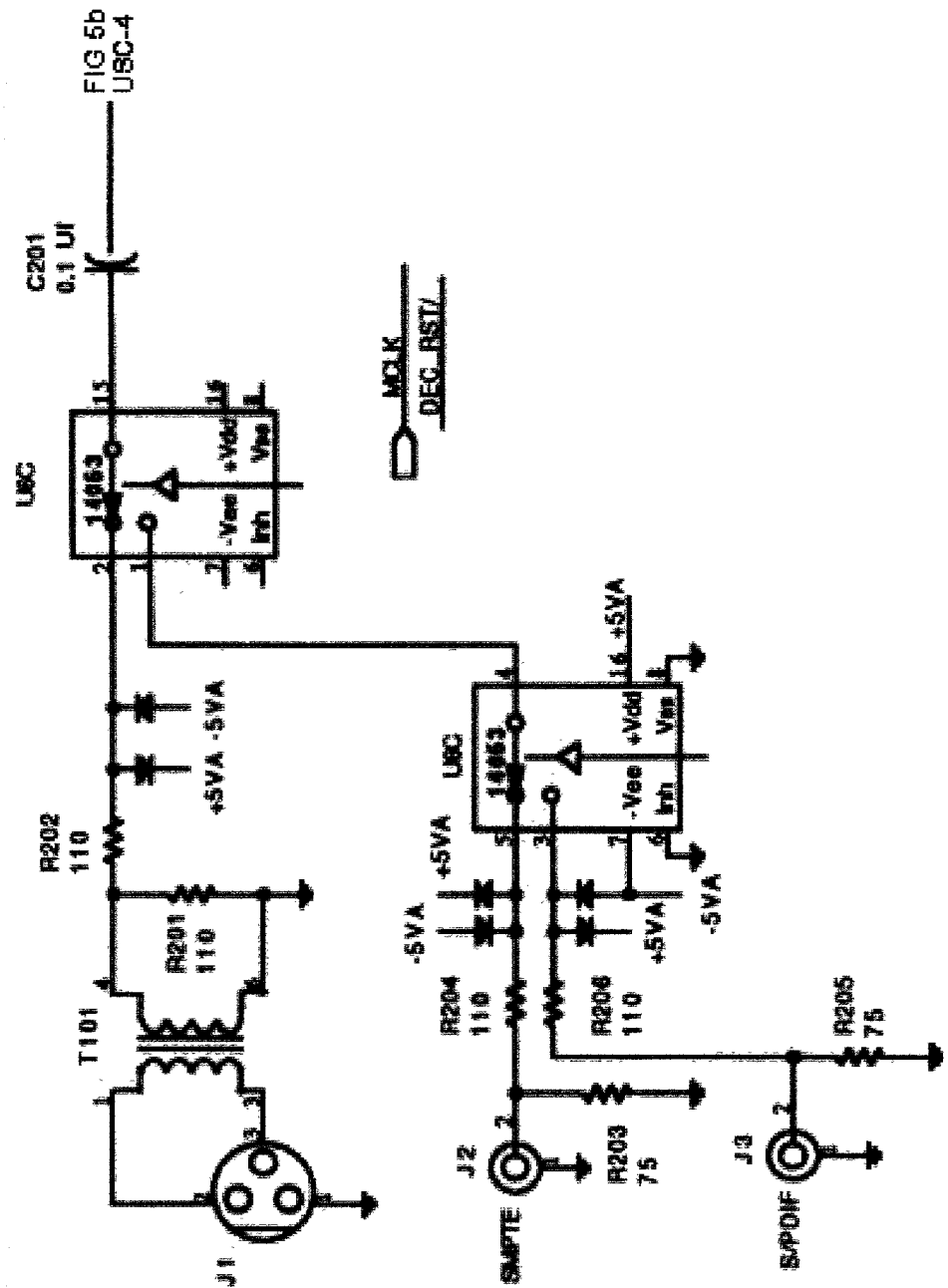

Audio Display Voice Over & Tone
Digital Audio

Audio Display Voice Over & Tone
Digital Audio

Audio Display Voice Over & Tone
Digital Audio

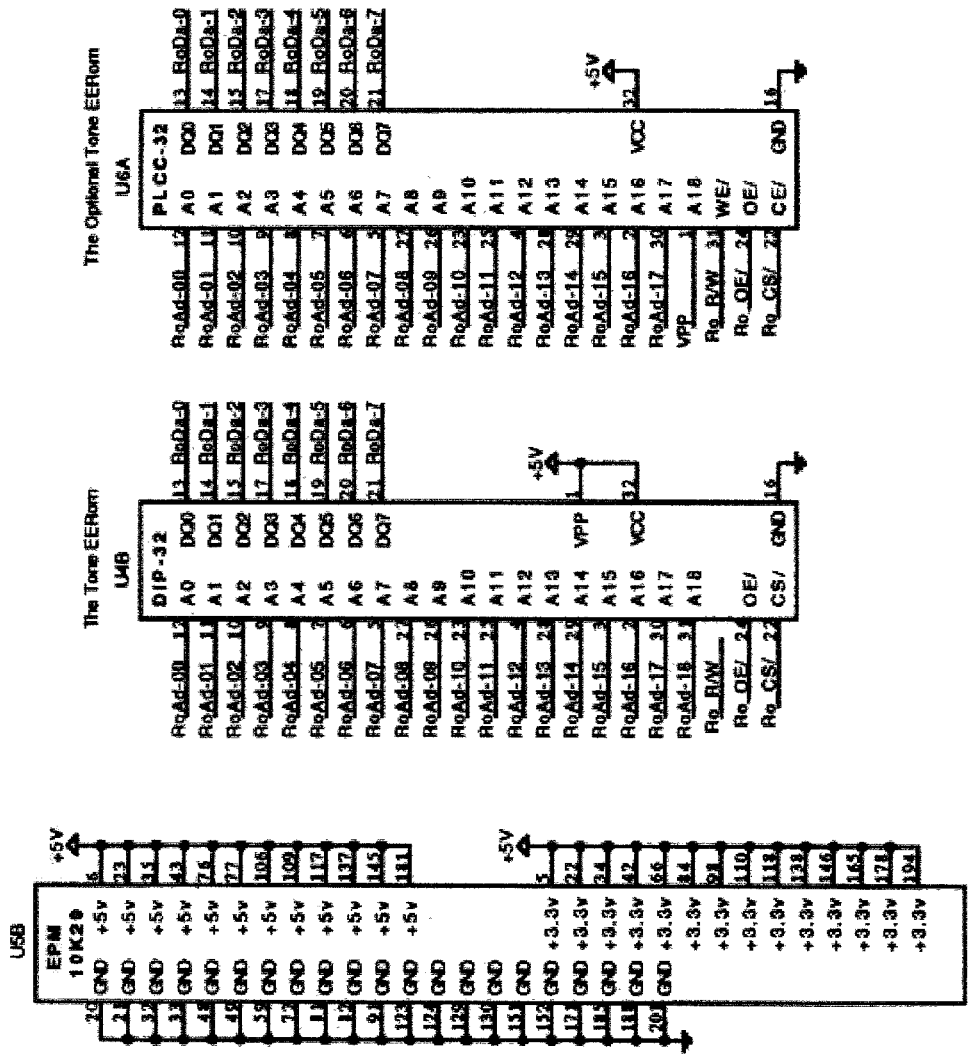

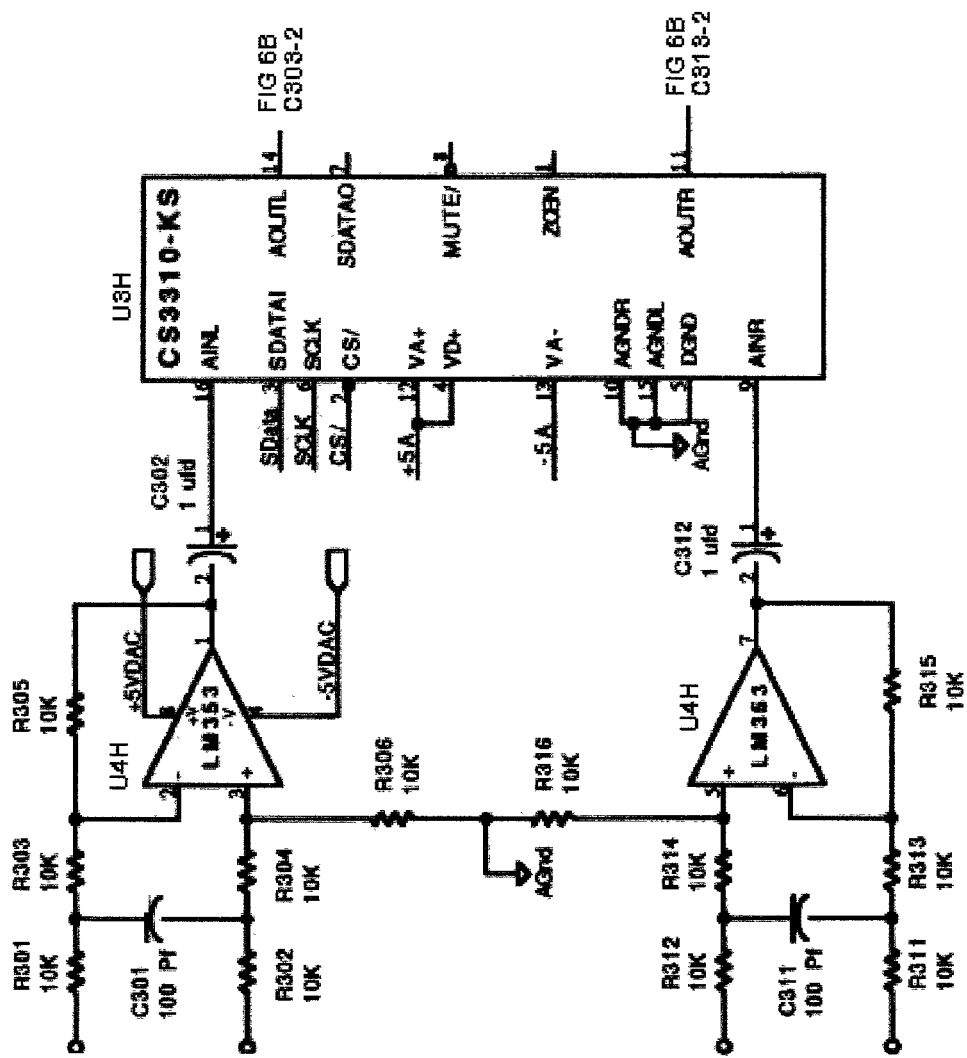

Audio Display Voice Over & Tone
Analog Audio Output

Audio Display Voice Over & Tone
Analog Audio Input

Audio Display Voice Over & Tone
Analog Audio Input

Audio Display Voice Over & Tone
Analog Audio Input

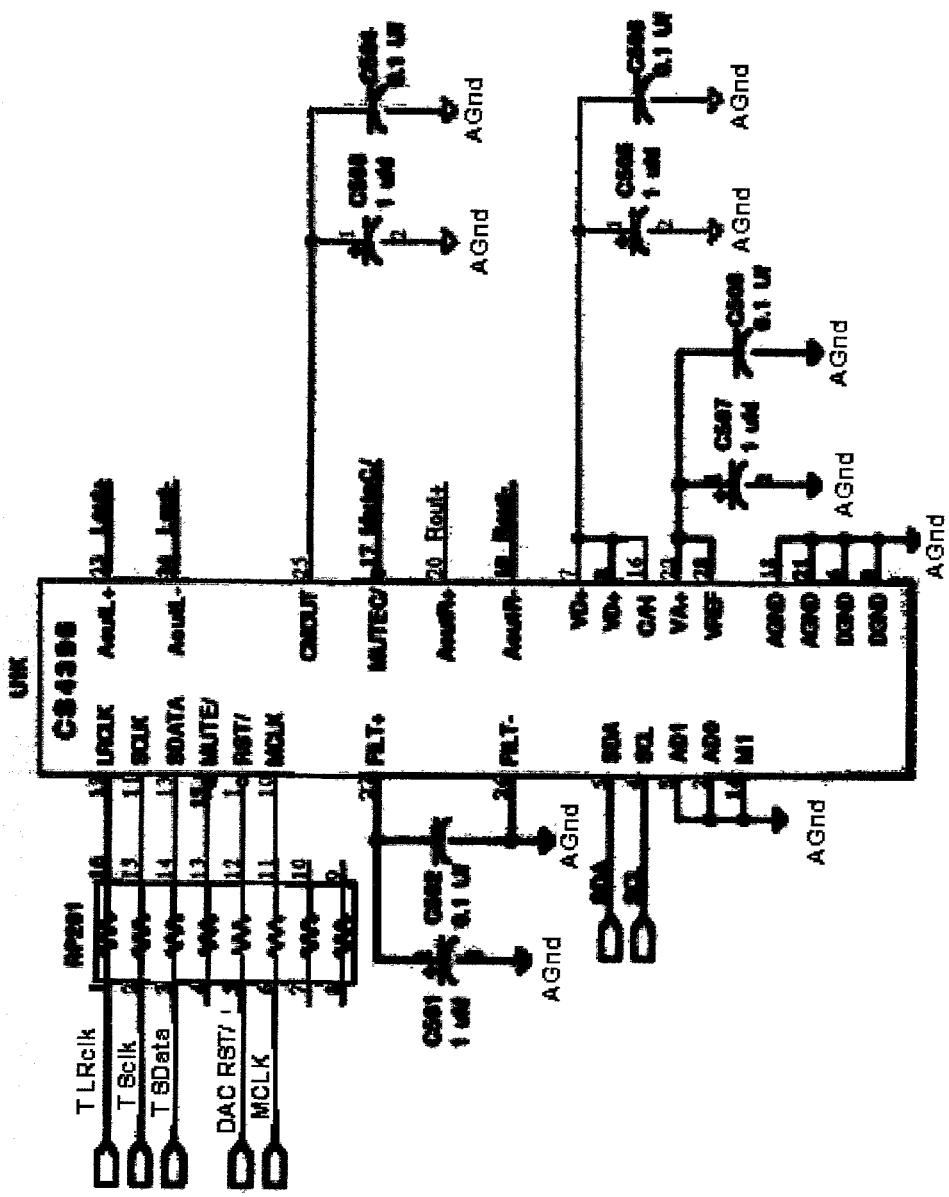

Audio Display Voice Over & Tone
Analog Audio Line Output

Audio Display Voice Over & Tone
Analog Audio Line Output

AUDIO MONITORING AND CONVERSION APPARATUS AND METHOD

BACKGROUND OF THE INVENTION

The invention relates to the utilization of electronic signals, and finds particular usefulness with audio signals, in digital and/or analog forms, such that the audio signals may be operated on to obtain programs of particular audio information or characteristics. While the invention pertains generally to any manipulation of an electronic type signal and especially audio and audio type signals, it will find particular utilization in the film and television industries where the audio portion of entertainment or educational programs is manipulated in order to create, edit and/or distribute (broadcast) such programs.

1. Field of the Invention

The present invention relates to the field of manipulation of electronic signals, and finds particular usefulness in manipulation of audio signals for program applications. The preferred embodiment of the invention is described herein with respect to audio type signals by way of example to those of ordinary skill in the art. The preferred embodiment given by way of example pertains in particular to cost effective and operator convenient apparatus and method for monitoring television and film program audio signals, combined with the ability of converting the audio signals from analog to digital or digital to analog forms, converting digital sample rates and providing testing, monitoring and manipulation of analog and digital forms of the signal(s) as well as providing mixing of audio signals, commonly referred to in the industry as voice over.

2. Description of Related Prior Art

The invention will be described by way of example in respect to its preferred embodiment as used in the television and film industries. In television and film production and distribution facilities it is common to perform various monitoring and processing of audio signals, with each instrument used providing one or two of the following functions: visually monitoring, audibly monitoring, converting analog to digital, converting digital to analog, converting sample rate, locking sample rate to a reference, monitoring for digital errors, controlling level, mixing signals, inverting polarity, reversing and/or redirecting channels, and testing audio signal equipment. It is common for a television or film production facility to have numerous pieces of equipment which together can, if suitably enabled by one or more skilled operators, provide any of all of the above functions and capabilities. Unfortunately this equipment is expensive and complex, placing its use out of the reach of the relatively unskilled operator, and placing the cost out of the reach of the relatively budget constrained facility. In particular, in many low and medium budget television stations and production facilities, money has not been available to acquire the equipment and train the operators to perform all of the desired manipulation, monitoring and processing functions and capabilities, including those mentioned above. Fortunately these facilities have heretofore been able to operate utilizing relatively unsophisticated and limited equipment in conjunction with analog audio signals, foregoing the desired capability to perform various ones, many or all of the above mentioned functions.

With the transition to digital broadcasting and in particular to high definition digital broadcasting with accompanying high quality and multiple channels of digital audio, which operation has been mandated by Congress, many small and medium budget facilities can not afford to purchase the many individual pieces of equipment, hire the skilled operators and provide the operator training needed to convert their existing analog signals and equipment for use in the mandated high quality digital broadcasting. There is as a consequence a great need for (relatively) low cost apparatus and methods which can incorporate many or all of the above desired features and be operated by relatively lower paid and relatively unskilled operators.

The present invention overcomes the above described and other prior art cost and operator disadvantages by providing the capability of performing many of the most needed audio signal manipulation, monitoring and processing functions and capabilities in an inexpensive, simple and easy to use fashion which may be utilized by relatively unskilled operators in low and medium budget facilities. It is expected that the low cost and convenience afforded by the herein described inventive features will be appreciated and used by facilities of all sizes as it is made available and known thereto by the teachings herein.

BRIEF SUMMARY OF THE INVENTION

The present invention provides a cost effective and simple to operate capability of manipulating, monitoring and processing analog and/or digital signals, and is especially applicable to audio signals, to provide visual monitoring, audible monitoring, conversion from analog to digital and digital to analog, converting sample rate, locking sample rate to a reference, monitoring for digital errors, controlling level, mixing signals, inverting polarity, reversing and/or redirecting channels, and testing audio signal equipment. Monitoring as described above may refer to monitoring of levels, monitoring of frequency content (for example energy content or amplitude or response at various frequencies), monitoring of distortion, monitoring of errors, or any other monitoring which is useful in producing or distributing electronic signals and particularly audio signals.

A low cost apparatus embodying the invention is described herein by way of example with respect to the preferred embodiment, which apparatus makes use of several novel signal processing, interconnection, sharing and other techniques which provide a high degree of flexibility and performance as well as ease of use, at a low cost.

Of particular novelty is the combination of the mixer with one or more of the above features which may be utilized as a voice over feature with digital audio signals, for example the combination of a visual level monitor and voice over mixer and visual level monitor and analog to digital converter.

BRIEF DESCRIPTION OF THE DRAWINGS

FIG. 3 shows a block diagram of the 2 channel Audio Dissolver/Mixer portion of the preferred embodiment of the invention.

DETAILED DESCRIPTION OF THE INVENTION

One of ordinary skill in the art will be able to practice the invention, tailored to a form suitable for particular application with a particular type of signal(s) as desired, from the description given in respect to Figures, taken in conjunction with the teachings set out herein. The Figures show preferred and readily available industry components which are identified by industry standard part number which will be recognized by one of ordinary skill who will also know to substitute other components for those shown with respect to the preferred embodiment from the teachings herein. In particular it is intended that the teachings herein will enable the person of ordinary skill in the art to practice the inventive features with components and circuit elements which are presently known, as well as with those components and circuit elements which are not presently known but which will become known to the person of ordinary skill as future technology developments permit.

Figures show significant elements of the preferred embodiment of the invention, along with their significant interconnection and cooperation, for the purpose of illustrating the instant invention. It will be appreciated that some minor details of elements, their interconnection and cooperation are left out of the Figures for clarity and/or to avoid unnecessary recitation of what is already known in the art, and one of ordinary skill in the art will nevertheless know to practice the invention from the teachings herein without resorting to undue experimentation or further invention. In particular, single lines are shown with arrows indicating primary level interconnections to elements shown as boxes. One of ordinary skill in the art will know that many of these lines represent multiple connections with multiple signals which flow both in the main directions given by the arrows, but also in reverse direction as is common in the art. Additionally one of ordinary skill will recognize that the boxes showing various elements represent known circuitry constructed of known electronic components, with various internal interconnections, again not shown for clarity. Despite the abbreviations to the drawings which are made for purposes of clarity and/or avoiding unnecessary complexity, the person of ordinary skill in the art will know from the present teachings to practice the invention, including the details of construction which have been omitted.

Figure 1B:
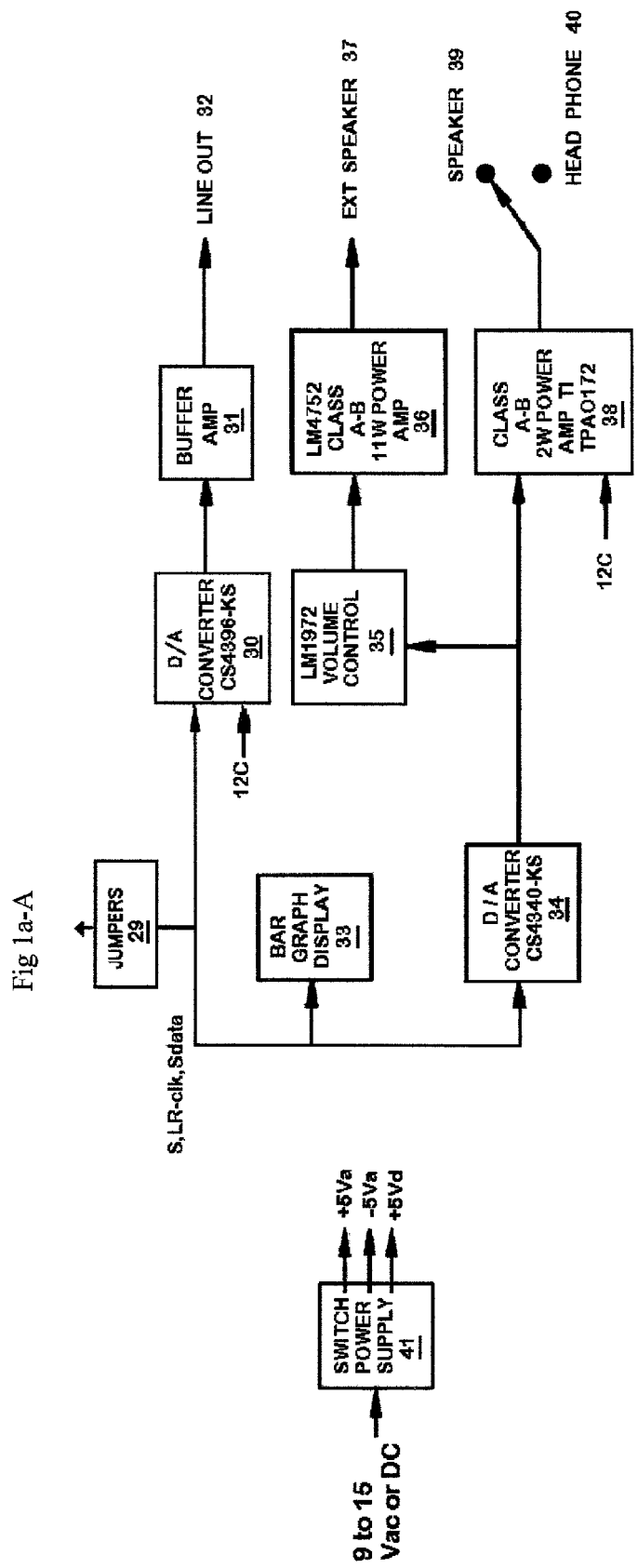
FIG. 1 shows a block diagram of the preferred embodiment of the invention

FIG. 1 shows a block diagram of the preferred embodiment of the invention which is given by way of example. Remote (for example computer) control connections 1 and 2 are provided in well known RS232 form which in conjunction with RS-232 buffer 3 provide remote control of the invention through connection with Z8 microprocessor 4. Other forms of remote or computer control, as well as other types of processors 4 may be practiced as will be known to one of ordinary skill from these teachings. The microprocessor operates to configure and control the various programmable components utilized throughout FIG. 1, as well as providing various other computer operations via its bus management unit 7, both operating with respective control, address and data interconnections, as will be described more fully below. Microprocessor 4 operates with a program and data storage, which is preferred to be electrically erasable read only memory, EE-ROM 5, which holds the operating program for 4 as well as various data and configuration information relating to the operation of the invention. As one example, various operating parameters set by the human operator, such as input signal selection, volume level, output signal frequency reference and others may be written into a section of 5 by processor 4 and stored so that in the event of a power failure all of the stored operating parameters may be safely preserved, allowing processor 4 to return the operation to the condition existing before the power failure upon the return of power. This is a very useful feature in that no operator intervention is required to place everything back into operating condition after an absence of power. Other memory and processor configurations may be utilized as well as will be known from the teachings herein.

Microprocessor 4 also communicates with a 2 line display 6 for displaying messages to the operator or others. This display contains internal memory which stores the displayed message and 4 may read from or written to this memory. Other display configurations may be utilized as well as will be known to one of ordinary skill. Additionally, data which is stored in update E-Rom 9 may be accessed via Bmu 7 (buss management unit) and utilized to configure various components, for example the optional Tone Generator and Mixer of 8 and Sample Rate Converter 13.

Various audio inputs which take on various forms may be utilized with the present invention. In particular the preferred embodiment may receive well known professional digital AES/EBU data stream 14, consumer S/PID (a.k.a. S/PDIF) data stream 15, SMPTE data stream 16 or analog signal 21. These input signals may be present with standard sample rates, for example 32, 44.1, 48 or 96 kHz, or may have nonstandard sample rates. It is preferred to utilize a digital receiver 13 which accommodates a wide range of sample rates, for example the Crystal Semiconductor CS8420-CS. If desired, an optical interface may be utilized to receive an input signal in one or more of the known optical (for example fiber optic) interfaces.

Field Programmable Gate Array, FPGA 8 provides optional Tone Generator and Audio Mixer in conjunction with optional E-Rom 10 and Flash Rom 11 as will be described in more detail with respect to FIGS. 2 and 3. FPGA 8 also provides clock, timing and control signals for various of the audio signal processing operations such as sample rate conversion and digital audio receive and transmit. In particular, FPGA 8 operates to receive television sync (i.e. video sync from a video signal) 17 and in conjunction with VCO 19 and LPF 20 operates as a PLL to phase lock various signals such as the digital audio sample clock to the television sync. In this manner, digital audio may be frequency and/or phase synchronized to the video to facilitate handling of related audio and video signals within television or film systems. This feature is of particular use whenever digital audio and video (or film) must be combined into a single data stream (or on a film) such that a fixed and known number of audio samples are combined with a fixed and known number of video samples or frames. This practice prevents the problem of missing or duplicated audio samples from occurring in the combined data stream (or on the film) which in turn prevents clicks and pops from occurring in the audio program. Alternatively, 8 also provides (under control of 4) clock, timing and control signals for various of the audio signal processing operations which are locked to the incoming digital signal sample rate, or to a fixed crystal frequency from 18. In this fashion (and assuming the presence of Sample Rate Converter option of 13) the output digital signal sample rate may be locked to the input sample rate, locked to video 17 or a fixed frequency which is crystal derived. It is preferred that differing standard frequencies may be selected which may then be referenced to the selected reference all under control of the microprocessor 4 in response to an operator set priority or scheme as will be described further herein. For example, standard frequencies of 32, 44.1, 48 and 96 kHz may be selected for the output signal, with the selected frequency being referenced to video 17, crystal oscillator 18 or one of the input signals 14, 15 or 16. Of course, by the simple addition of another receiver 13 and if desired a mux 12, it will be possible to lock the output signal from a given input, for example 14 to another input, for example 16. It will also be possible to provide the same audio signal in differing output sample rates by utilizing multiple output drivers 26 as will be described in more detail below.

It will be recognized that each or any of these input signals may carry multiple audio signals, examples including two channel stereo, four channels for example consisting of four surround channels or two stereo channels in two languages or 5.1 channel Dolby™ surround sound. The preferred embodiment described herein utilizes two channel stereo, but one of ordinary skill in the art will know to utilize the invention with any desired number of signals from the present teachings.

Digital inputs 14, 15 and 16 are coupled to an input multiplexer 12 where, under control of the processor 4, the desired input signal is selected. The selection of input signal may be automatic, with the processor 4 receiving information from 13 as to whether or not a particular input has a signal present, and if not moving to the next input. The sequence and ones of tested inputs may be programmed in manufacture, but is preferred to be selected by the operator. For example 4 may be programmed to look at 14 first to see if a signal is present, and if not to look to another input but if there is a signal present to remain on 14 until such time as the signal is no longer detected, at which time it looks at 16 to see if a signal is present, and if so to remain there until no signal is detected, at which time it looks at 15. Alternatively, 4 may be programmed to only look to 16 and if no signal is present to look to 14, and if no signal is present to look again to 16, with the inspection of 14 and 16 continuing at predetermined intervals until a signal is found. With the capability of 4, the user may configure the automatic inspection and selection of inputs based on particular criteria which is important to the user's system. As another example, 4 may be configured by the user to look to 16, and if it is not present, for a user programmed period of time to switch to 14 for a predetermined amount of time, during which a message such as "audio problems are being experienced by the network" is played back by a recording device (triggered by 4 via 2) after which input 16 is again selected. This automatic playback of messages may be set to continue for the duration of the absence of 16. From the teachings herein one of ordinary skill in the art will know to utilize different variations of such automatic operations feature of the invention to suit particular applications.

One of ordinary skill in the art will recognize that in the present description which deals with the absence of a signal, that such description may apply as well to a signal which is present but which exhibits one or more significant error(s). The automatic or programmed operation may very well take into account such factors as the number and type of errors present, and the time and/or frequency of their presence in making a determination to switch from one input to another, or to remain on a known input. The selection of inputs may include analog, digital or optical inputs as desired.

The above description of automatically selecting an input for purposes of selecting an audio signal will also be useful for selecting an input for use as the frequency reference for the internal clocking and/or output signal clock rate as well. The selection of the particular input(s) to be used as a reference (as compared to that used for the program audio signal) may follow the same control as the program audio selection or may follow different related or independent control. Again such factors as signal presence, type of errors present, and the time and/or frequency of their presence will be useful factors which may be programmed in manufacture, or selected by the operator, in making a determination to switch from one input to another, or to remain on a known input for use as the reference. The selection of inputs may include analog, digital or optical inputs as desired.

In keeping with the description herein, parameters which are established in manufacture and/or by an operator may be utilized such that selecting an audio signal which may be present at one of the inputs and/or the signal processing section operate in response to such parameters in order that such selecting and/or processing may automatically change in response to at least one signal present on an input.

The digital input is received by Digital Audio Rx 13 which optionally includes a sample rate converter. Receiver 13 performs equalization, clock recovery, digital data stream characterization and error checking of the selected audio input, and provides the recovered clock, data stream characteristics, audio data and error data to the other circuitry. The data stream characterization and error checking allows the nature of and defects in the digital data to be determined and reported to the processor 4 for possible action.

The novel configuration of selecting the desired digital audio signal is achieved by the nonobvious use of an analog signal multiplexer 12 to couple the desired digital signal 14, 15 or 16 to the Receiver 13. In this fashion the cost of having a separate digital receiver for each digital input, followed by a digital selector, is avoided.

The optional sample rate conversion of 13 may be utilized to provide digital output signals at a sample rate slightly or greatly different from the input signal, for example a 44.1 kHz sample rate signal from the S/PID input may be converted to 48 kHz which is phase locked to video as provided by 8. The control of the Sample Rate Converter may be automatic, with 13 identifying the sample rate of the incoming digital signal to the processor 4, which in turn configures 13 to convert the incoming rate to a desired rate which has been previously selected. This operation may be programmed either in manufacture or by the operator. Additionally the Sample Rate Converter allows the receiver to capture digital data streams which are off frequency due to defects in the transmitting equipment. For example satellite or internet transmission of digital data streams can impart unwanted frequency shifts and/or phase jitter to the sample rate of the data stream, which may be corrected by the Sample Rate Converter to provide an output sample rate which is frequency locked to stable internal crystal 18. The selection of an output sample rate which is not locked to the incoming sample rate is preferred to be automatic, occuring under control of processor 4 whenever receiver 13 reports frequency variation or other errors above a predetermined level which is set in manufacture or by operator.

Also shown in FIG. 1 is an analog audio input 21 which is buffered by 22, gain adjusted by 23 to achieve volume (or level) control, buffered again by 24 and converted to digital at the desired sample rate by 25. The sample rate is selected by 4 via 8 as described elsewhere herein.

The digital audio data and corresponding clock and control signals from 25 and 13 are coupled to FPGA 8. Processor 4 makes a selection of one or the other audio signal from 13 and 25, or both, to be utilized. Audio from 13 or 25 may simply be selected by 4 to be output, or they may be mixed together in 8 (under control of 4) or may be delayed, or multiple of these operations may be performed as is be described herein. The selected (or mixed or delayed) digital audio is then coupled via 29 for conversion to analog by 30–38, and to 26 for outputting as one or more digital signals.

Element 26 is a standard digital audio transmitter circuit, a Crystal Semiconductor CS8420-CS which processes the input digital audio signal to provide industry standard AES/EBU and SMPTE digital audio signals. Recall that the sample rate which is utilized by 26 for these signals may be of a particular frequency and referenced to a particular source under control of 4. Multiple elements 26 operating in parallel, or separately, may be provided is desired to provide multiple output signals with differing characteristics. For example multiple outputs each having a different sample rate and/or different delay may be provided.

Digital audio from 13 or 25 (or mixed from 8) is coupled to 29 and the selected one is displayed on visual Bar Graph Display 33. It is preferred that this display consist of 64 LEDs, 32 for each channel and displaying in substantially 3 dB increments the instantaneous and average levels of the audio signal in each channel as is well known in the art. Other types of visual displays will be known suitable for this function as well.

Digital audio from 29 is also coupled to a precision D/A converter 30 where it is converted to analog, which is coupled via buffer amplifier 31 to analog line output 32. Buffer 31 is preferred to include level setting jumpers or other adjustments to enable the operator to set the analog output level of 32 to a desired value. The elements 30 and 31 are preferred to be options as not all systems will have need of an analog line output. Multiple buffers 31, coupled to D/A 30 may be provided if desired, and multiple D/As 30 may also be provided in additional line outputs are desired.

Digital audio from 29 is additionally coupled to a monitor D/A converter 34 where it is converted to analog, which is coupled via Power Amp 38 to analog line outputs 39 and 40. Output 39 is preferred to be connected to speakers which are internal to the housing of the device utilizing the invention whereas output 40 is preferred to be a standard plug and socket type connection for use with headphones. Buffer 38 is preferred to include a level setting adjustment to enable the operator to set the output level of 39 and 40 to a desired value. Analog audio from 34 is coupled via volume control 35 and Power Amp 36 to output 37 which is preferred to be connected to external speakers. With the above configuration the operator may choose to audibly monitor the audio signal(s) by use of headphones, internal speakers or external speakers.

While various output forms of the processed audio signal are shown by way of example, such as 27, 28, 32, 37, 39 and 40 one of skill in the art will know from the teachings herein that such output signals may be removed, duplicated or multiplexed as needed to fit or satisfy a particular system or other needs as desired. For example, the digital output signals 27 and 28 may be combined into one output which is optionally configured to AES/EBU or SMPTE format. As another example signals 32, 37, 39 and 40 may be combined in one output which is configured to fit the particular application. The configuration may be by manufacture, operator or automatic. For example, an analog output may automatically configure to appropriate output level and power by sensing the load impedance which is connected. A low impedance, for example 8 $\Omega$, would cause the output to be configured to drive a speaker by including volume control 35 and power amplifier 36. A higher impedance, for example 600 $\Omega$, would cause the output to be configured to drive at line levels by including buffer amplifier 31. An even higher impedance, for example 2000 $\Omega$, would cause the output to be configured to drive a headphone by including volume control 35 and power amplifier 38. Similarly, if the output sensed a load of 75 $\Omega$ it would be configured as a SMPTE digital output, and if it sensed a load of 150 $\Omega$ it would be configured as an AES/EBU output. A particularly cost effective arrangement may be utilized having one or more digital outputs which automatically configure as SMPTE or AES/EBU and one or more analog outputs which automatically configure as speaker, line or headphone outputs.

One of ordinary skill will recognize from these teachings that ones or all of the elements 26 through 40 may be eliminated or provided in duplicate if desired, in order to reduce cost or provide audible and/or visible monitoring of multiple programs, selected input signal(s) and/or processed signal(s) and/or with multiple types of monitors and/or outputs in order to fit a particular system or requirements.

It has been above suggested to delay the audio signal as part of the operation of the invention and in particular it is suggested to be part of the signal processing which takes place. Such delay is often useful in maintaining audio to video timing or lip sync, in systems where significant amounts of video delay are present due to video signal processing. Such delay may be added at virtually any point in the signal path, however it is preferred to occur in conjunction with and as part of the sample rate conversion 13, as is taught in detail in U.S. Pat. Nos. 5,920,842 and 6,098,046. The combination of variable delay and sample rate conversion elements makes the inclusion of pitch correction to allow rapid delay changes without pitch errors is highly desired. Control of the amount of delay, pitch correction, pitch shifting (with or without delay change) and other delay related functions may be automatic, programmed or via remote control all as taught in the aforementioned patents. In particular, the addition of an input for a video processor's digital delay output signal (DDO) will find considerable use in many applications. This signal is used to convey the amount of video delay to the delay portion of the device in order that the audio delay may be made to match the video delay.

Element 41 of FIG. 1 shows a switching power supply which provides necessary circuit power to the various circuit elements and is preferred to utilize a wall mounted power supply, commonly known as a wall wart. Other types of power supply will be known to one of ordinary skill in the art.

Figure 2:
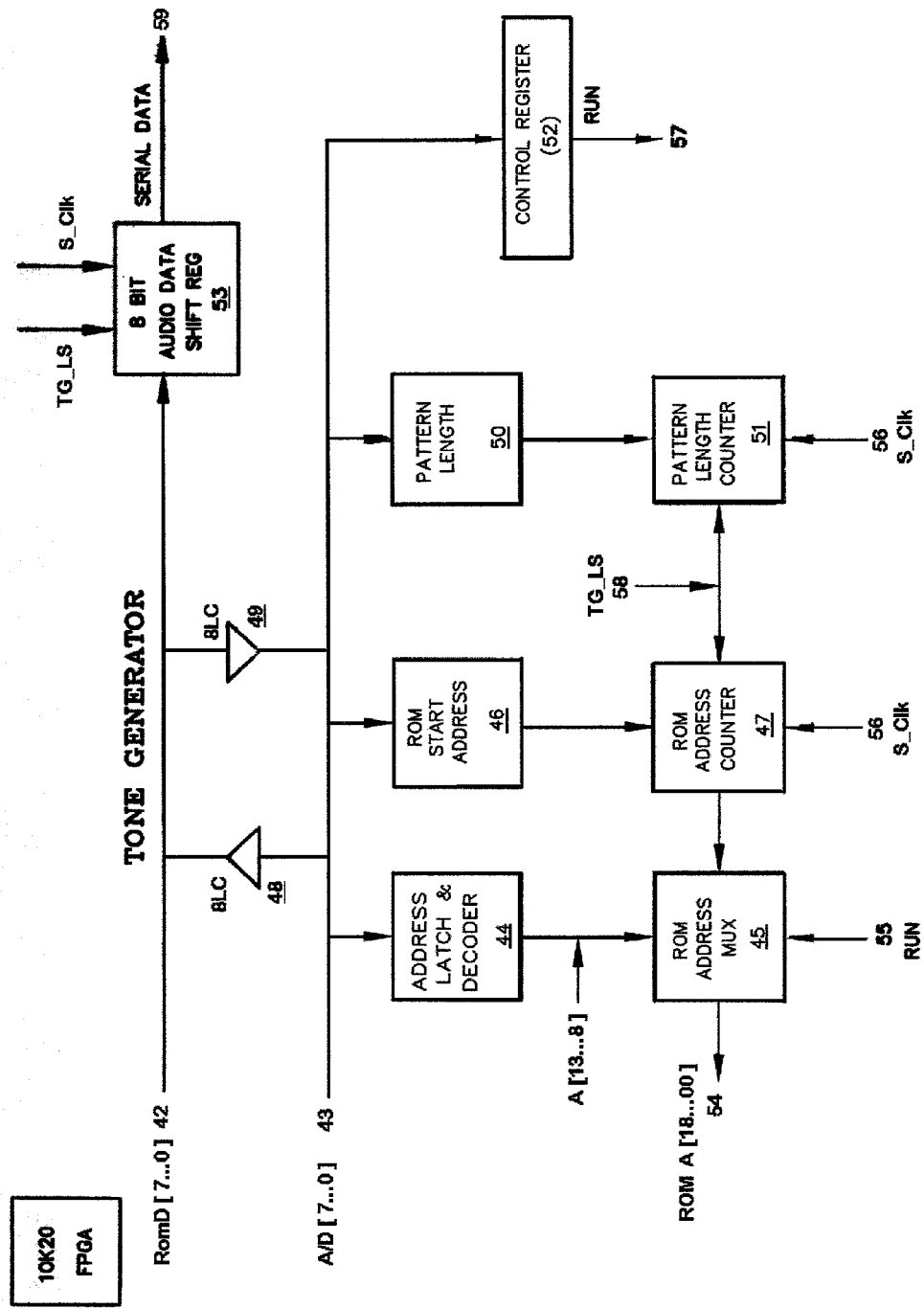
FIG. 2 shows a block diagram of the tone generator portion of the preferred embodiment of the invention.

FIGS. 2 and 3 show novel details of the Tone Generator and 2 Channel Stereo Audio Dissolver/Mixer respectively which are preferred to be implemented with the 10K20 FPGA 8 of FIG. 1.

FIG. 2 shows a novel Tone Generator which may be utilized for generating various types of test signals which may be selected to be output. FIG. 2 shown interconnection between ROM and processor 4 via Address/Data 42. ROM is shown as E-Rom 10 and/or Flash Rom 11 of FIG. 1. Data used for tone and test signal generation is stored in this ROM and if Flash Rom is used, such data may be written into the ROM under control of processor 4, or alternatively in manufacture. Data 42 in ROM is addressed from 45 via Rom Address Data 54. Rom Addresses from processor 4 are latched by 44 and coupled to Rom Address Mux 45 which supplies address data 54 to the ROM. For each address, the ROM returns data 42 which is coupled to either 53, or via 49 to 46, 50 or 52.

For a particular test signal, data for only one characteristic cycle is stored in ROM. For example, a sine wave at a 1 kHz frequency would have 48 distinct data values for a 48 kHz clock frequency. These 48 values would be stored starting at a particular address in ROM. The processor 4 sends an address to 44 which selects a particular location in ROM where test signal paramaters such as the length of the test signal pattern (in clock cycles) and the starting address in the ROM where the actual data for the pattern is located. In the previous example, the address might be 275 and the length 48 samples. That information is loaded (in binary) into Pattern Length latch 50 and Rom Start Address latch 46, respectively. The Rom Start Address from 46 is loaded into the Rom Address Counter 47 where it is then coupled via the Rom Address Mux 45 to the ROM. Simultaneously with the address of the ROM data address for the selected test signal being placed at 54, the Pattern Length data is loaded into Pattern Length Counter 51. As in the earlier example, at the start of initilization ROM Address 54 would be the address 275 which is the start of the 1 kHz tone data, and 50 would contain length 48. As soon as processor 4 tells the generator to Run 55, the pattern length counter 51 is incremented at every clock 56, which generates a new address which is coupled via 47 and 45 to become ROM Address 54. By this operation every one of the 48 data values fo the 1 kHz tone is addressed by 54 with that data appearing at 42 to be loaded into Audio Data Shift Register 53 which outputs serial data which is selected by 8 to be coupled to 26 and/or 29 for utilization by the system.

One of ordinary skill in the art will recognize that for a sign wave, it is actually only necessary to store values for ¼ of a total sine period, these being the unique values to the sine wave. Thus for the 48 sample example above, only 12 unique samples may be stored, and by utilization of inversion and reversal all of the 48 values for the entire period may be had. This reduction in storage to the truly unique values may be had for many different test signals, allowing conservation of memory as well as improved performance, and may be practiced as desired in the practice of the inventive features described herein. The conversion of the stored unique values to the entire waveform period of values may be performed by dedicated circuitry as part of the address and data elements 44–47 and 50, 51, or may be performed by the microprocessor 4, or a combination of the two as will be known to one of ordinary skill in the art from the teachings herein.

Elements 48 and 49 allow the microprocessor 4 to send and access data and address information from one bus via the other, 52 allows the processor 4 to load control signals into a register for storage, for example to load the run signal 57 which instructs the counters 47 and 51 to run and Mux 45 to change to the run state. Register 52 thus turns tone generator on/off via run signal. Other control functions may be stored in 52 as well and utilized to provide other control signals (not shown). These inventive features allow flexibility and reduced cost by permitting the microprocessor 4 to interact more efficiently with other devices which are connected to the data and address busses 42 and 43.

FIG. 3 shows a novel 2 Channel Stereo Audio Dissolver/Mixer feature of the preferred embodiment. Note that only one channel each of Program Audio and Voiceover Audio are shown for clarity. The preferred embodiment utilizes stereo channels, and one of ordinary skill in the art will recognize that both left and right channel operation is desired, which is preferred to be achieved by operating at double the single channel speed. From the teachings herein, one of ordinary skill will be able to utilize these inventive features with 5.1 channel audio, or any other number of channels for program audio or Voiceover audio or both, as desired.

Program Digital Audio data 60 from 13 is latched into 62 and passed to 36 bit Holding & Shift Register 64. Similarly, Voiceover Digital Audio data 61 from 25 is latched into 63 and passed to Holding & Shift Register 65. The remainder of the circuit of FIG. 3 operates to mix the signals 60 and 61 by dissolve factors $\alpha$ and $1-\alpha$ respectively, where $\alpha$ ranges from 1 to 0. The dissolve factor can be thought of as the coefficient which is multiplied with the signal to achieve fading or gain control. Thus if the signal is multiplied by 1 it is passed at full amplitude, if multiplied by 0.5 it is passed at half amplitude, and if multiplied by 0 is is not passed. As $\alpha$ changes from 1 to 0, the effect is to fade Program Audio 60 down while at the same time fading Voiceover Audio 61 up. This is a useful effect which allows an operator to fade program audio down by several dB (or even to inaudible or zero levels) while simultaneously fading an announcer's voice up so that the announcer's message is mixed with the program audio for the period of time of the announcement. The unique circuit may also be utilized simply for gain control or other multiply type functions on any of the signals.

The particular apparatus and method of the Audio Disolver/Mixer is novel, being highly efficient, high performance and low cost. This Audio Dissolver/Mixer apparatus and method will find use in many applications other than the instant invention, for example such as implementing multiplier/accumulator cells for generalized signal processing and filter uses. For explanation, it will be assumed by way of example that audio samples are latched into 62 and 63 at 48 kHz rate, that is at every 48 kHz clock new data is loaded into 62 and simultaneously into 63. The elements 64–66 & 68–70 operate at 64 times that 48 kHz clock rate. The Dissolver/Mixer operation of 64–70 operates in ping/pong fashion such that a bit of data from 64 is selectively accumulated in 70 (with appropriate weighting) according to a bit of a from 67, followed by a bit of data from 65 being selectively accumulated in 70 (along with the immediately prior accumulated value) according to a bit of $(1-\alpha)$ from 67, followed by the next bit from 64, and then the next bit from 65, etc. until all 24 bits of each data byte which was latched into 62 and 63 is operated on. It may be noted that the action of 64–66 & 70 operates at 64 times the 48 kHz clock and thus would be capable of operating on 32 bit bytes in 62 and 63, however for convenience the preferred embodiment uses only 24 bit bytes from 62 and 63, which are shifted in special fashion into 62 and 64 with the remaining 8 bits capability for each byte simply being unused.

To initialize the operation at every 48 kHz clock cycle three bytes of data for a Program Audio sample, Voiceover Audio sample and mix coefficient $\alpha$ are simultaneously loaded into registers 62, 63 and 67, respectively. At the same time, the value in accumulator 70 is cleared to 0.

At the start of this 64×48 kHz clock cycle (i.e. 1–48 kHz clock cycle) audio data from the two channels 62 and 63, is shifted in special fashion into the output of 64 and 65 to provide the 24 bits of each audio sample data in 62 and 63 in 36 bit form. The special shift involves shifting each 24 bit word by 12 bits toward the LSB, thus dividing by 212, and padding the 12 most significant bit positions in the register 64 and 65** with the sign bit. This action loads the audio sample into the Holding & Shift Register as a 36 bit value which is the audio sample divided by 4096, while maintaining full precision of the original 24 bit sample value.

Multiplexer 66 first selects the Program Audio, to be applied to adder 69. At the same time the LSB of the coefficient $\alpha$ which is stored in 67 is shifted to the output of 68 and applied to accumulator 70. In the instance where the bit applied to 70 from 68 is low, the accumulation is inhibited, thus holding the previous value in 70 until the next cycle. If the bit from 68 is high, the accumulator is enabled to add the value from 64 to the accumulated value (which for the LSB of 68 will be zero since that is the starting value of 70). Thus for the time period when the LSB of 68 is selected, if the LSB from 68 is 1 the value in 64 (which is the program sample value divided by 4096) will be stored in 70. If the LSB from 68 is 0, the existing 0 in 70 is maintained unaltered.

After the LSB from 68 and the sample from 64 are operated on, the sample from 65 is operated on. This sample is the Voiceover audio value which has also been divided by 4096 as was the program audio sample. The accumulate process is repeated for the value in 65. Next, the shift registers 64, 65 and 68 shift to the next higher bit position (LSB+1) such that the value in 64 is the program audio sample divided by 2048, 65 holds the Voiceover audio divided by 2048 and 68 holds the next to LSB of the 12 bit coefficient from 67. The accumulate process is then repeated. The shift registers 64, 65 and 68 again shift to the next higher bit position (LSB+2) and the values in 64 and 65 again accumulated according to the bit in 68. The shift and accumulate process is repeated until all 12 divided values (4096 through ÷2) have been accumulated in accord with the corresponding bit of the scale factor in 67. At the end of the 48 (2 signals×2 channels each×12 bit coefficient) clocks nothing happens for the remaining 16 clocks (2×8) and the accumulator value is held. At the start of the next cycle, the accumulator value is loaded into 71. This accumulator value corresponds to α times the Program Audio sample value in 62+(1−α) times the Voiceover Audio sample value in 63. In other words it is a mix of the two samples, α times the value in 62 plus (1−α) times the value in 63. At the next instant, the accumulator value is cleared to zero, new audio sample values are loaded in 62 and 63, a new coefficient α is loaded into 67 and the process starts anew. The output of 71 is a 48 kHz stream of mixed values 72 which is passed to 26 and/or 29.

Note that in the preferred embodiment the 24 bit audio programs are multiplied by a 12 bit coefficient to perform a fade between the two. It may be recognized that many values which a traditionally multiplier would be capable of accepting are never used, with the preferred embodiment taking advantage of that fact in order to reduce the amount of complexity necessary to perform the desired operation as compared to the traditional approach of utilizing 16×16 bit multipliers. From the teachings herein, one of ordinary skill in the art will recognize that this novel embodiment may be configured to achieve any desired accuracy and precision with any desired number of signals and coefficients.

One of ordinary skill in the art will recognize from these teachings that there are several variations on this operation which may be employed. For example, instead of ping/pong operation, all the divided values of 62 may be accumulated in 70 followed by all of the divided values of 63. Divided values may be processed MSB first, or LSB first, or even in non-sequential order starting elsewhere, as long as the appropriate dividing takes place in the Holding & Shift Register, the appropriate bit is selected in 68 and appropriate weighting is accommodated in the accumulation process. For example, a limited number of coefficients may be utilized in 67 in recognition of the human ear's relative insensitiveness to changes in levels of loud sounds. There is no need to utilize full 12 bit precision of the coefficient in 67 for coefficients which are close to 1 and savings in multiply and accumulate steps may be had by eliminating coefficient precision. Additionally coefficients other than α and its compliment may be utilized as well, for example coefficients which are not precisely related such as α and β (which would require two numbers in 67) which may be preferred in order to have a nonlinear mixture of the two audio signals. Of course, one of ordinary skill must ensure that such problems as overflow of the accumulator or undesired loss of precision do not occur when selecting a desired precision of coefficient(s) and accumulation. Instead of utilizing a single bit at a time, multiple bits may be accumulated, again as long as the appropriate weighting is applied.

Control of the dissolve from program audio to voice over audio (by coefficient of α) may be under operator control, for example by repeatedly pushing a button which causes a change of some amount, for example 0.05, for every push, or by holding the button, or in preferred form by automatic control wherein 4 automatically adjusts the value of a to achieve a smooth transition from Program Audio to Voiceover Audio over a preselected amount of time. The start of the dissolve is preferred to be controlled by a simple push of a remotely mounted or front panel button and the end of the dissolve by a second push of the same button. For example, the operator wishing to initiate a Voiceover announcement would push the starting button, at which time processor 4 will fade the program down and the announcer up over a period of a few seconds, the announcer makes the announcement after which the operator again pushes the starting button (or alternatively a separate stop button) at which time processor 4 fades the announcer down and the program back up. Another alternative is for the operator to hold the button until the desired level is achieved at which time the button is released and the level is maintained. After the announcement another push of the button returns the levels to normal. Another alternative is to use two buttons, one for fade up and one for fade down, the operation being automatic upon a single push, or at a controlled rate as the button is held. As yet another alternative, a rotary or slide type of control may be included whereby the operator mechanically positions the control to achieve the desired degree and speed of fade. Such may be accomplished by utilization of a digital encoder which outputs a digital number representative of the degree of movement of the mechanical control as is well known in the art. It may be noted that frequently the announcer will be the operator, making both the announcement and controlling the operation of the audio mixer. One of ordinary skill in the art will be able to configure an appropriate interface to the operator to fit a desired system and method of operation from the teachings herein.

FIGS. 4–8 are sheets 1–5 respectively of a schematic diagram showing the detailed configuration of the preferred embodiment of the invention. The schematic diagram corresponds directly to the overall block diagram, but provides additional detail which will aid the person of ordinary skill in the art in understanding the inventive concepts discussed above.

Figure 4A:
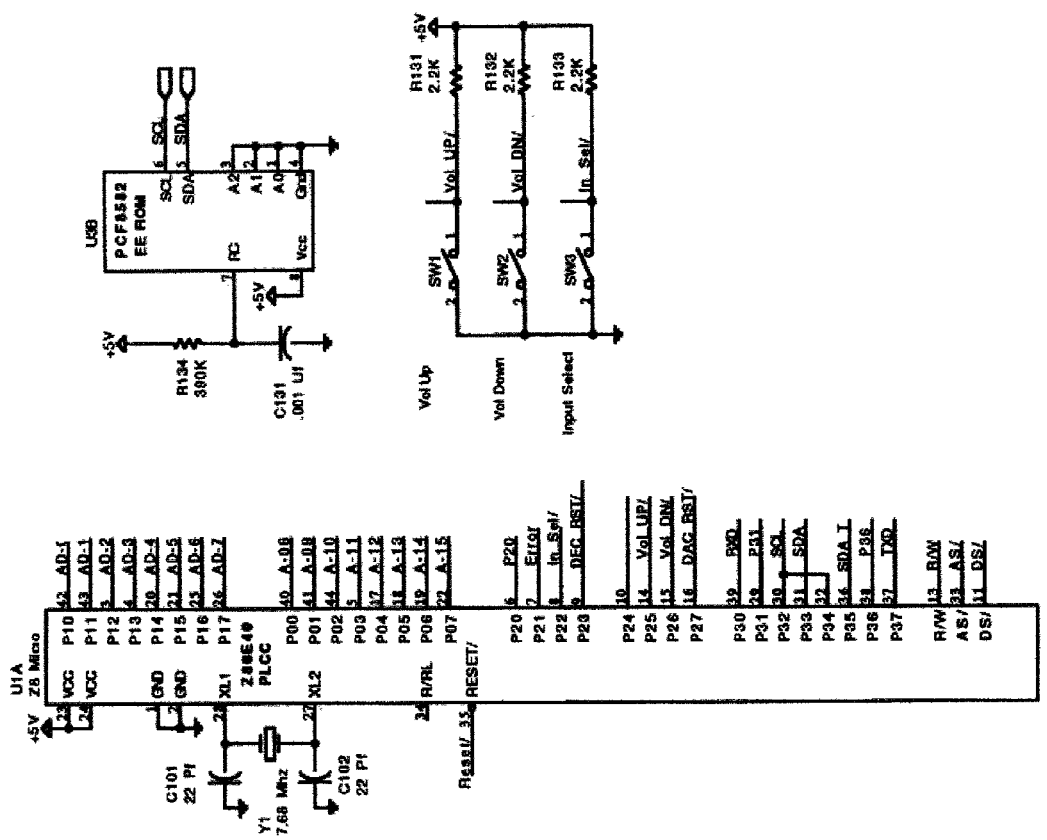
FIGS. 4–8 show sheets 1–5 respectively of the preferred embodiment of the invention.
Figure 4E:
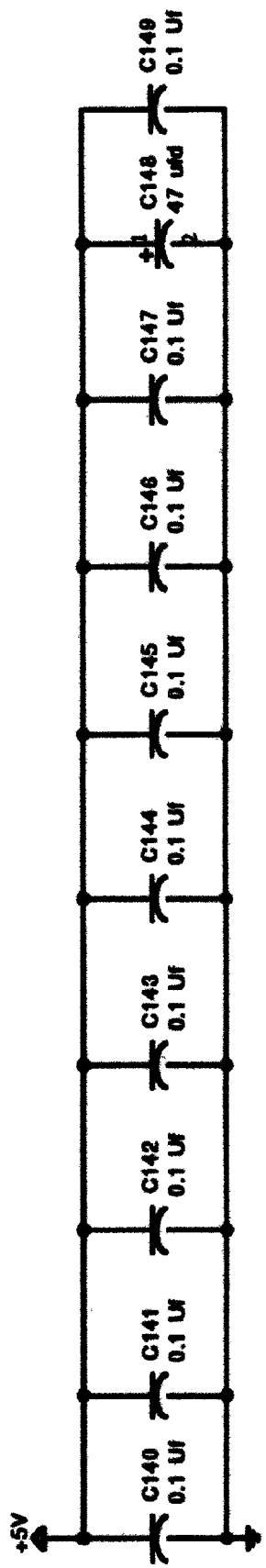

FIG. 4 shows U1 the Z8 microprocessor corresponding to 4 of FIG. 1. Note that a second, test, version of U1 is provided at TS1 for aid in troubleshooting failures. J6 of FIG. 4 corresponds to 1 and 2 of FIG. 1 and U3 to 3. U7 corresponds to 5, U4 to 7, U6 to 8. J4 is the connection for 33 which is not shown.

Figure 5B:
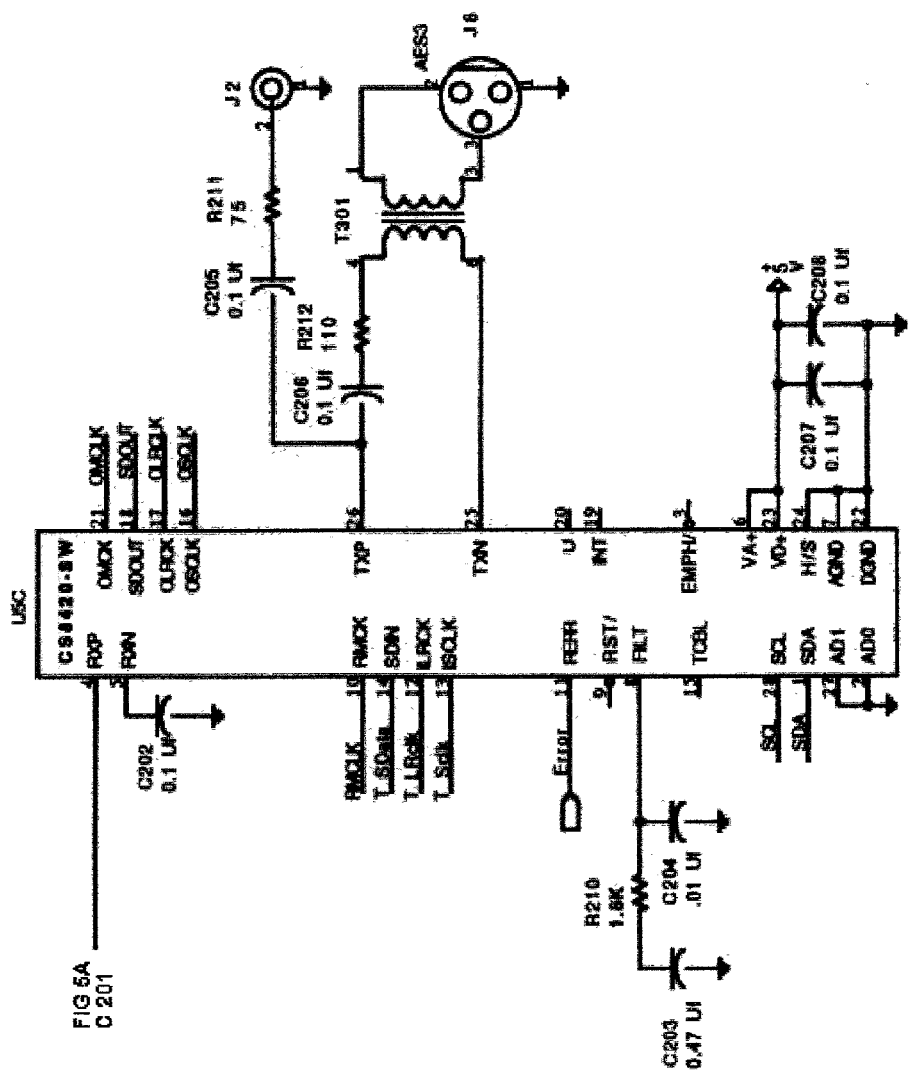
Figure 5C:
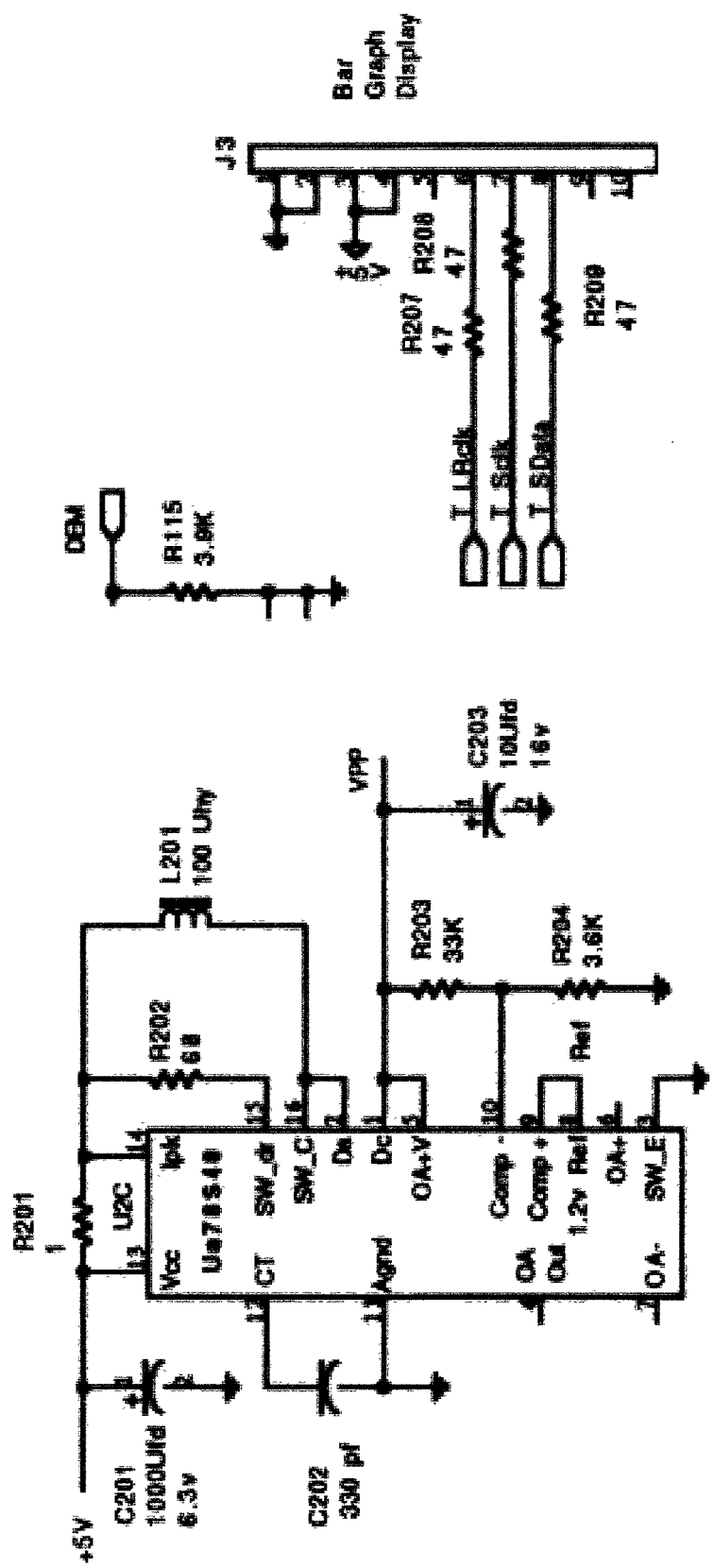
Figure 5D:
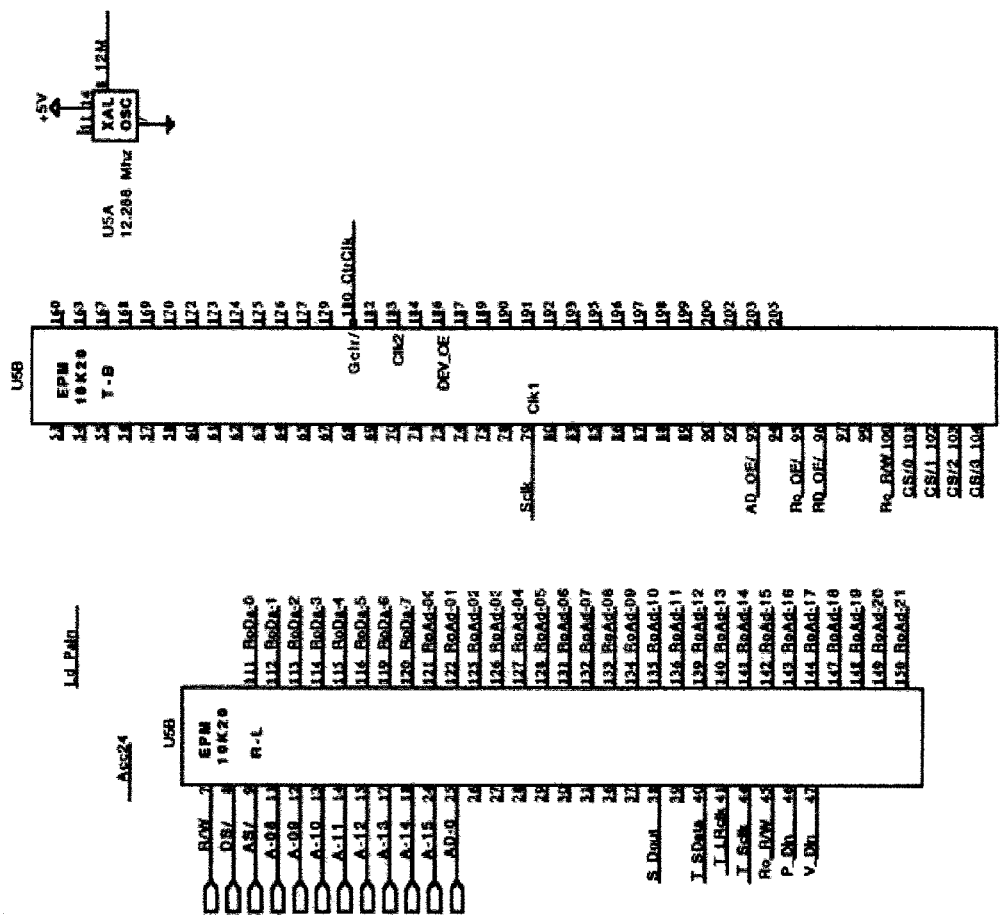

FIG. 5 shows J1 corresponding to 14, J2 (upper left) to 16 and J3 (upper left) to 15. U8 and associated circuitry corresponds to 12, U10 and associated circuitry to 13 and 26, J2 (upper right) to 28, J8 to 27. U9 and associated circuitry corresponds to 18, U2 and associated circuitry to 19 and 20. U11 and associated circuitry corresponds to 10 and 11.

Figure 6B:
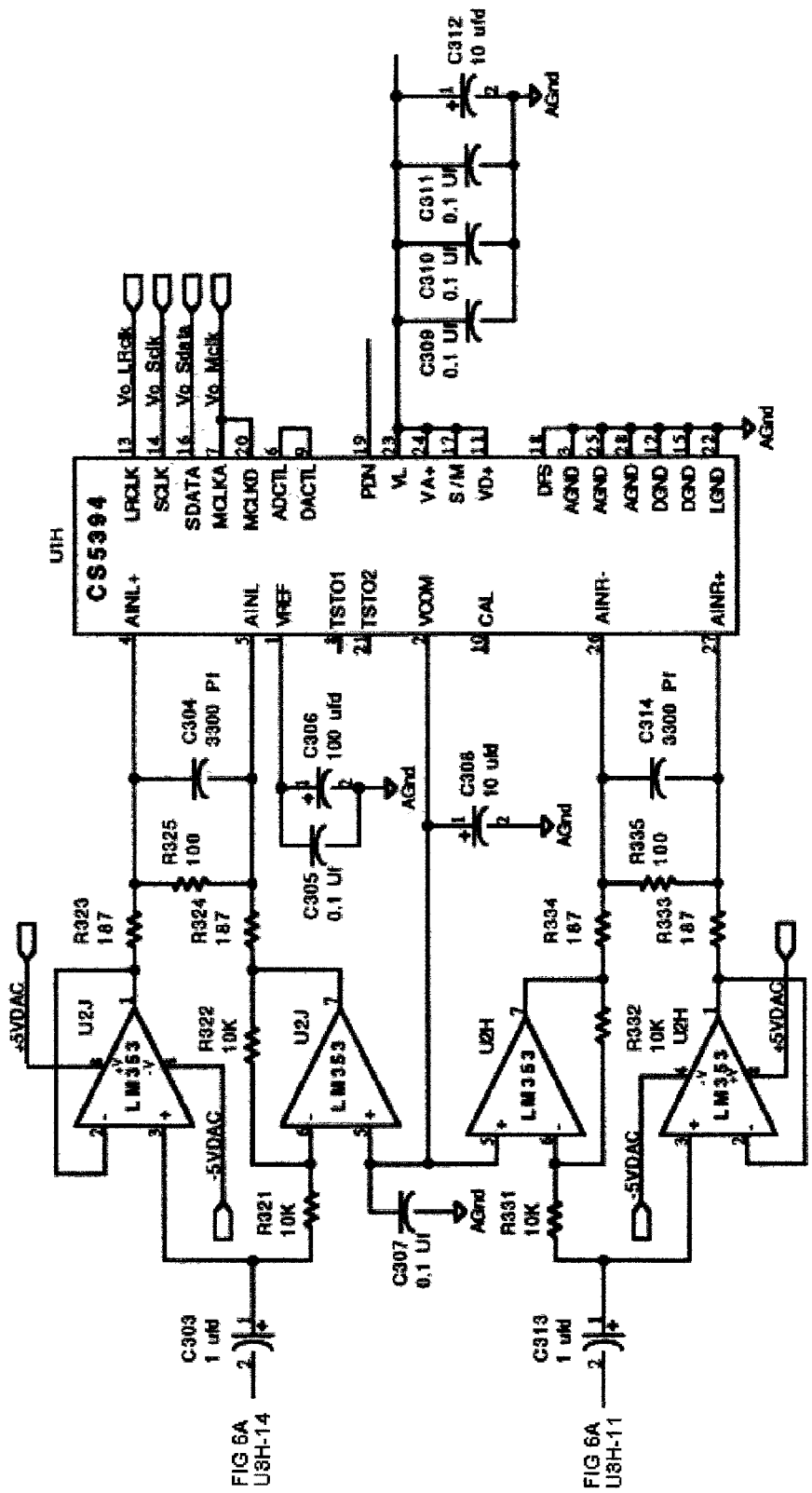

FIG. 6 shows U12 and associated circuitry corresponding to 22, U13 and associated circuitry to 23, U14 and U15 and associated circuitry to 24 and U16 and associated circuitry to 25.

Figure 7A:
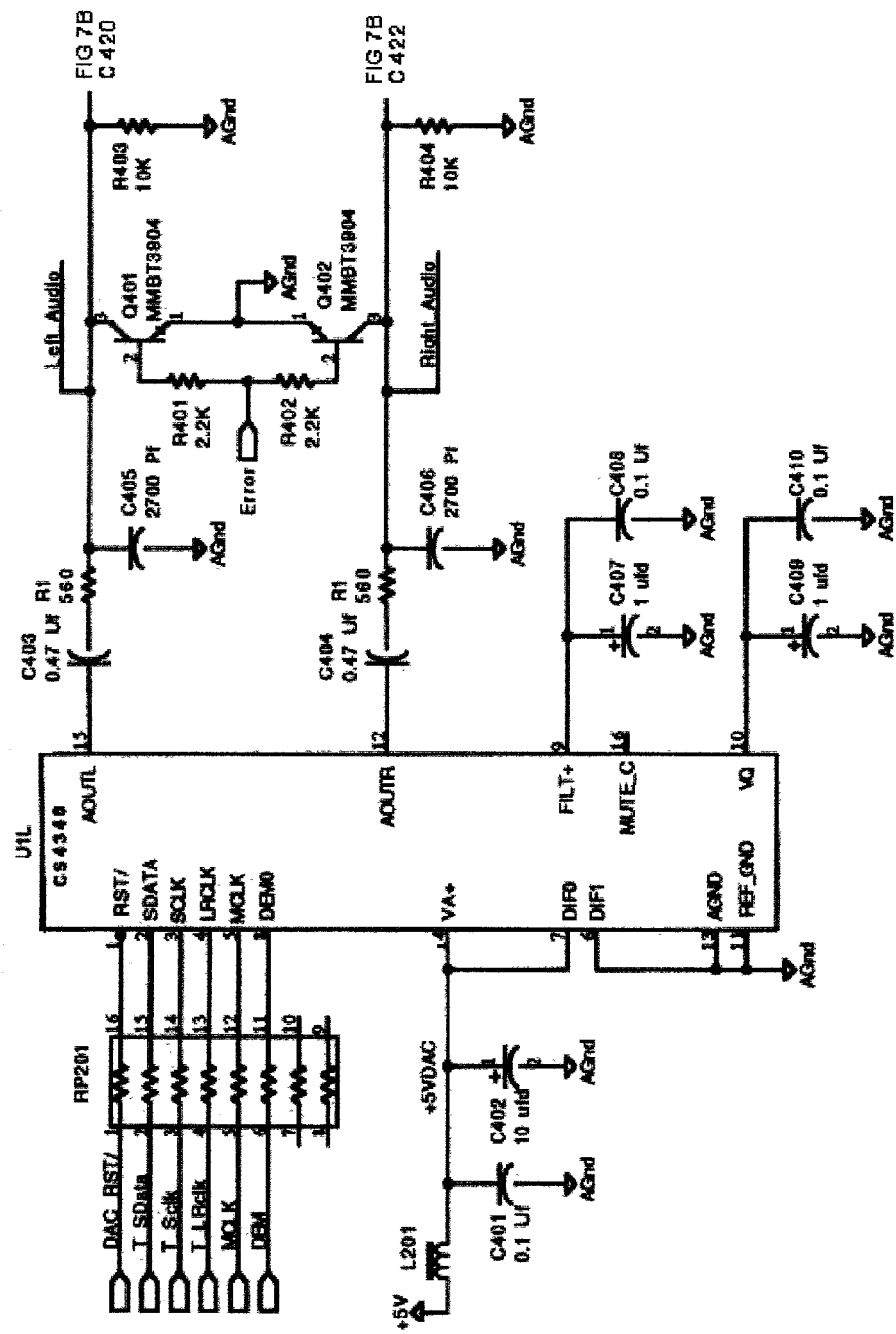
Figure 7B:
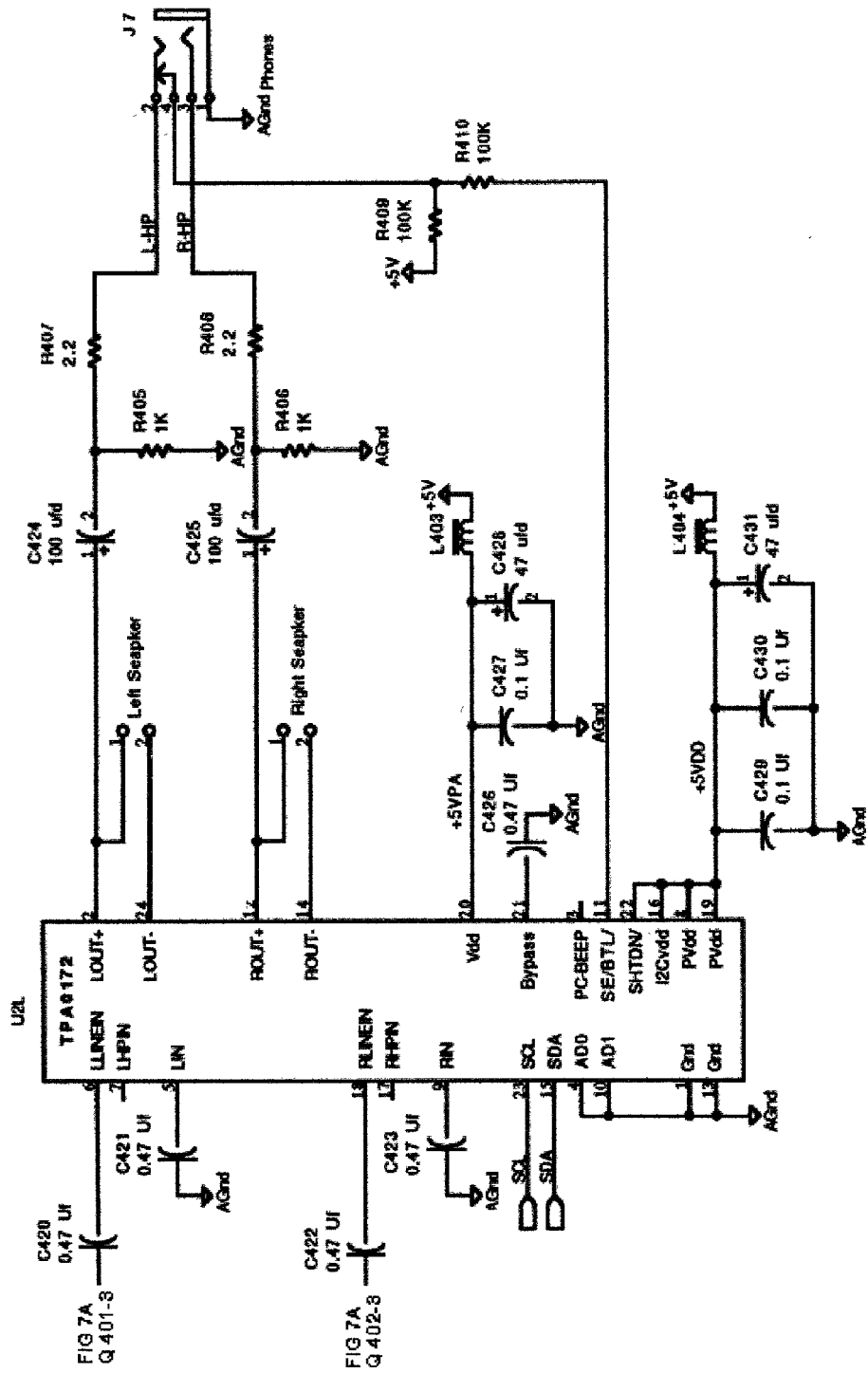
Figure 7C:
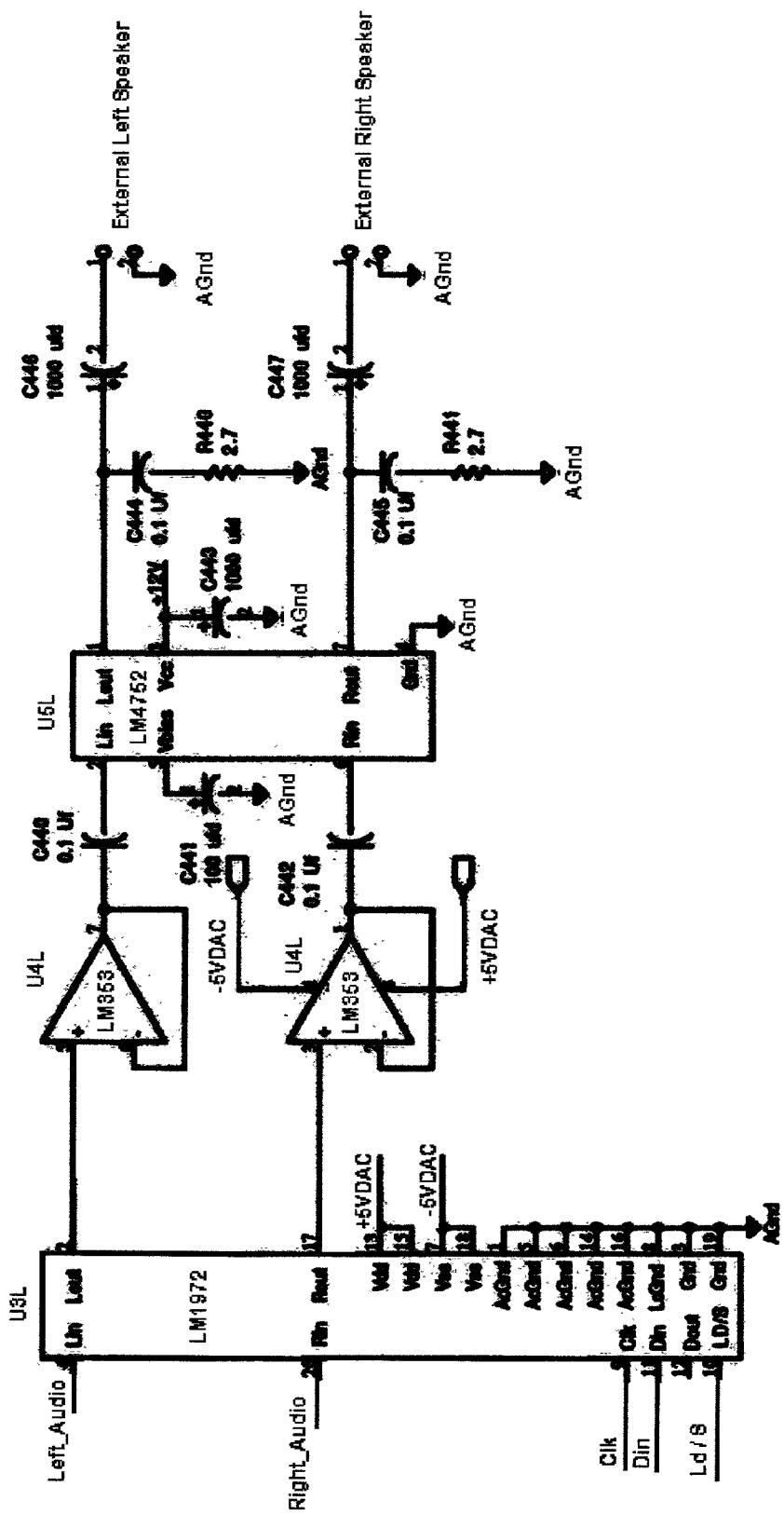

FIG. 7 shows U17 and associated circuitry corresponding to 34, U18 and associated circuitry to 38, U19 and associated circuitry to 35, U20 and U21 and associated circuitry to 36.

Figure 8B:
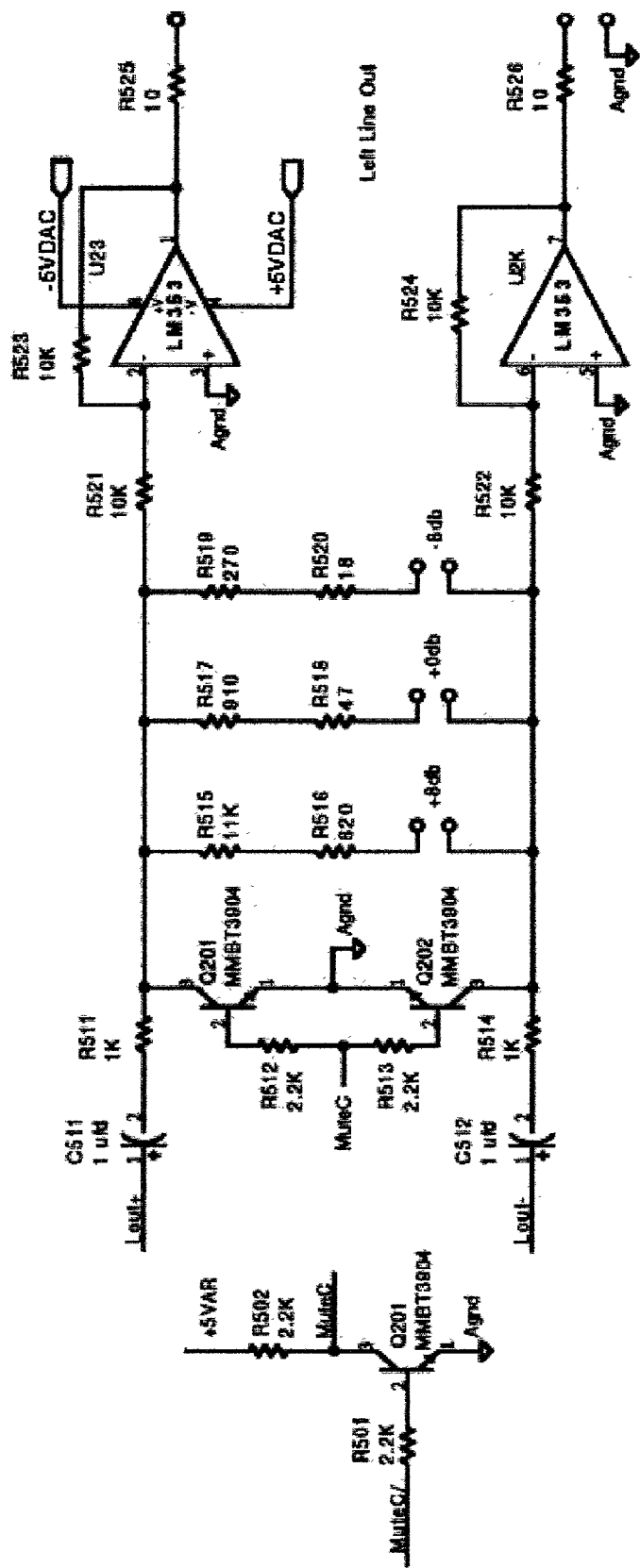
Figure 8C:
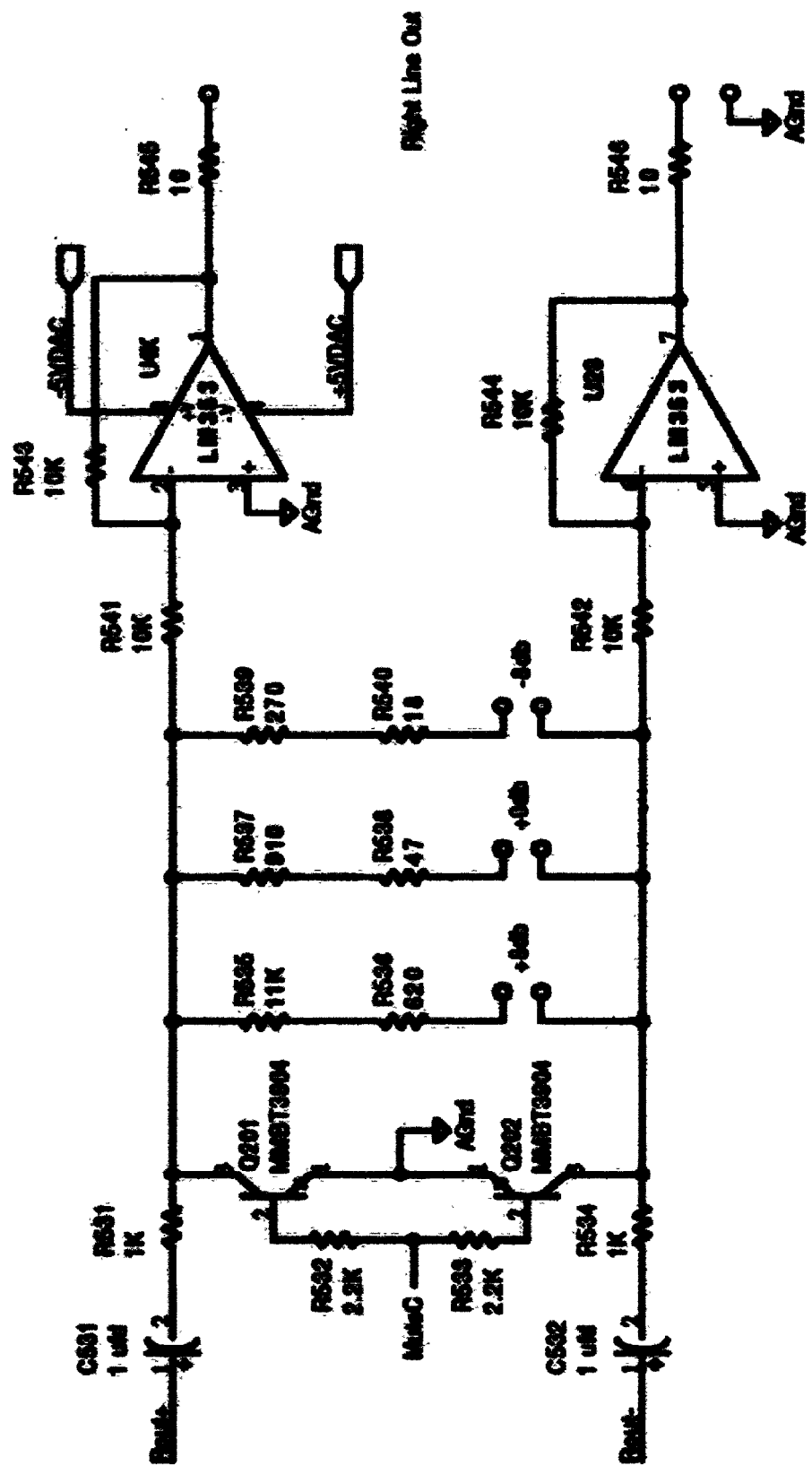

FIG. 8 shows U 22 corresponding to 30 and U23 and associated circuitry corresponding to 31.

While the invention has been described above in respect to the preferred embodiment by way of example, one of ordinary skill in the art will know from the teachings herein to resort to various modifications, substitutions and combinations of the preferred elements and steps which are taught in order to practice the invention in forms which are tailored to fit particular systems and/or requirements, all without departing from the spirit and scope of the invention as claimed.

What is claimed is:

1. An audio monitoring and signal processing apparatus including in combination:
   a) a plurality of audio signal inputs, each operable to receive an audio signal, at least one of which receives a first digital audio signal having a first data rate and at least a second of which receives a second digital audio signal having a different data rate than said first data rate, each of which first and second digital audio signals is carried via one or more channels,
   b) a selector for selecting the audio signal which may be present at one of said inputs of a),
   c) a signal processing section responsive to process said selected signal of b) to provided a processed signal carried via one or more channels,
   d) a plurality of output circuits, each responsive to all channels of said processed signal of c) to output said processed signal in a distinct known form,
   e) a monitor circuit responsive to said selected signal of b) and/or said processed signal of c) to provide audible and/or visible monitoring thereof.

2. An audio monitoring and signal processing apparatus including in combination:
   a) a plurality of audio signal inputs, each operable to receive an audio signal, at least one of which receives a first digital audio signal having a first data rate and at least a second of which receives a second digital audio signal having a different data rate than said first data rate, each of which first and second digital audio signals is carried via one or more channels,
   b) a selector for selecting the audio signal which may be present at one of said inputs of a),
   c) a signal processing section responsive to process said selected signal of b) to provided a processed signal carried via one or more channels,
   d) a plurality of output circuits, each responsive to all channels of said processed signal of c) to output said processed signal in a distinct known form,
   e) a monitor circuit responsive to said selected signal of b) and/or said processed signal of c) to provide audible and/or visible monitoring thereof,
   f) parameters which are established in manufacture and/or by an operator wherein said elements b) and c) operate in response to said parameters such that at least one of the selecting of b) and the processing of c) automatically changes in response to at least one signal present on one said input of a).

3. An apparatus as claimed in claim 1 or 2 further including a mixing element operable to mix another input audio signal with said selected signal of b) as part of providing said processed signal of c).

4. An audio monitoring and signal conversion method including in combination:
   a) providing a plurality of audio signal input connections, at least one of which is capable of receiving digital audio signals of different data rates,
   b) selecting one of the audio signals which may be present at one of said input connections of a) which selected audio signal is carried via one or more channels,
   c) processing said selected signal of b) to provide a processed signal carried via one or more channels,
   d) outputting all channels of said processed signal of c) in a plurality of distinct known forms,
   e) monitoring said selected signal of b) and/or said processed signal of c) in audible and/or visible form.

5. An audio monitoring and signal conversion method including in combination:
   a) providing a plurality of audio signal input connections,
   b) selecting a plurality of the audio signals which may be present at one of said input connections of a) which selected audio signals are of different rates and are carried via one or more channels,
   c) processing said selected signal of b) to provide a processed signal carried via one or more channels,
   d) outputting all channels of said processed signal of c) in a plurality of distinct known forms,
   e) monitoring said selected signal of b) and/or said processed signal of c) in audible and/or visible form,
   f) utilizing parameters which are established in manufacture and/or by an operator such that at least one of the selecting of step b) and the processing of step c) automatically chances in response to at least one signal present on one said input connection of a).

6. A method as claimed in claim 4 or 5 further including a mixing step operable to mix a second signal with said plurality selected signal of b) as part of providing said processed signal of c).

7. An audio monitoring and signal conversion method including in combination:
   a) providing a plurality of audio signal input connections at least one of which is capable of receiving audio signals in digital form having differing data rates,
   b) selecting one of the audio signals which may be present at one of said input connections of a), which audio signal is carried on one or more channels,
   c) processing all of the channels of said selected signal of b) to provide a processed signal which includes one or more channels,
   d) outputting all channels of said processed signal of c) in a plurality of distinct known forms at least one of which is analog and at least one of which is digital,
   e) monitoring said selected signal of b) in audible and/or visible form.

8. An audio monitoring and signal conversion method including in combination:
   a) providing a plurality of audio signal input connections at least one of which is capable of receiving audio signals in digital form having differing data rates,
   b) selecting one of the audio signals which may be present at one of said input connections of a), which audio signal includes one or more channels,
   c) processing said selected signal of b) to provide a processed signal which includes one or more channels and which processed signal is responsive to all of the channels of said selected signal, d) outputting all channels of said processed signal of c) in a plurality of distinct known forms at least one of which is analog and at least one of which is digital,
    e) monitoring said processed signal of c) in audible and/or visible form.

9. A method as claimed in claim 7 or 8 further including a mixing step operable to mix a second signal with said selected signal of b) as part of providing said processed signal of c).

10. An audio monitoring and signal conversion method including in combination:
    a) providing a plurality of audio signal input connections,
    b) selecting one of the audio signals which may be present at one of said input connections of a), which audio signal is carried on one or more channels,
    c) processing all of the channels of said selected signal of b) to provide a processed signal which includes one or more channels,
    d) outputting all channels of said processed signal of c) in a plurality of distinct known forms at least one of which is analog and at least one of which is digital,
    e) monitoring said selected signal of b) in audible and/or visible form,
    f) utilizing parameters which are established by an operator such that at least one of the selecting of step b) and the processing of step c) automatically changes in response to at least one signal present on one said input connection of a).

11. An audio monitoring and signal conversion method including in combination:
    a) providing a plurality of audio signal input connections,
    b) selecting one of the audio signals which may be present at one of said input connections of a), which audio signal is carried on one or more channels,
    c) processing all of the channels of said selected signal of b) to provide a processed signal which includes one or more channels,
    d) outputting all channels of said processed signal of c) in a plurality of distinct known forms at least one of which is analog and at least two of which are digital and are distinct by virtue of having different clock rates,
    e) monitoring said selected signal of b) in audible and/or visible form.

12. An audio monitoring and signal conversion method including in combination:
    a) providing a plurality of audio signal input connections,
    b) selecting one of the audio signals which may be present at one of said input connections of a), which audio signal is carried on one or more channels,
    c) processing all of the channels of said selected signal of b) to provide a processed signal which includes one or more channels,
    d) outputting all channels of said processed signal of c) in a plurality of distinct known forms at least one of which is analog and at least two of which are digital and are distinct by virtue of meeting different industry standards for digital audio signals,
    e) monitoring said selected signal of b) in audible and/or visible form.

13. An audio monitoring and signal conversion method including in combination:
    a) providing a plurality of audio signal input connections,
    b) selecting one of the audio signals which may be present at one of said input connections of a), which audio signal includes one or more channels,
    c) processing said selected signal of b) to provide a processed signal which includes one or more channels and which processed signal is responsive to all of the channels of said selected signal,
    d) outputting all channels of said processed signal of c) in a plurality of distinct known forms at least one of which is analog and at least two of which are digital and are distinct by virtue of having different clock rates,
    e) monitoring said processed signal of c) in audible and/or visible form.

14. An audio monitoring and signal conversion method including in combination:
    a) providing a plurality of audio signal input connections,
    b) selecting one of the audio signals which may be present at one of said input connections of a), which audio signal includes one or more channels,
    c) processing said selected signal of b) to provide a processed signal which includes one or more channels and which processed signal is responsive to all of the channels of said selected signal,
    d) outputting all channels of said processed signal of c) in a plurality of distinct known forms at least one of which is analog and at least two of which are digital and are distinct by virtue of meeting different industry standards for digital audio signals,
    e) monitoring said processed signal of c) in audible and/or visible form.

15. An audio monitoring and signal conversion method including in combination:
    a) providing a plurality of audio signal input connections,
    b) selecting one of the audio signals which may be present at one of said input connections of a), which audio signal includes one or more channels,
    c) processing said selected signal of b) to provide a processed signal which includes one or more channels and which processed signal is responsive to all of the channels of said selected signal,
    d) outputting all channels of said processed signal of c) in a plurality of distinct known forms at least one of which is analog and at least one of which is digital,
    e) monitoring said processed signal of c) in audible and/or visible form,
    f) utilizing parameters which are established by an operator such that at least one of the selecting of step b) and the processing of step c) automatically changes in response to at least one signal present on one said input connection of a).

* * * * *